(12) United States Patent
Sparago

(10) Patent No.: US 12,007,227 B2
(45) Date of Patent: *Jun. 11, 2024

(54) FAILURE PREDICTION AND ANALYSIS TECHNIQUES

(71) Applicant: E2G CORR SOLUTIONS, LLC, Shaker Heights, OH (US)

(72) Inventor: Michael T. Sparago, Wilbraham, MA (US)

(73) Assignee: The Equity Engineering Group, Inc., Shaker Heights, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/668,172

(22) Filed: Feb. 9, 2022

(65) Prior Publication Data

US 2022/0268578 A1 Aug. 25, 2022

Related U.S. Application Data

(63) Continuation of application No. 16/382,131, filed on Apr. 11, 2019, now Pat. No. 11,262,196.
(Continued)

(51) Int. Cl.
*G01B 21/08* (2006.01)
*G06F 17/18* (2006.01)

(52) U.S. Cl.
CPC ............. *G01B 21/08* (2013.01); *G06F 17/18* (2013.01)

(58) Field of Classification Search
CPC .... G01B 21/08; G06F 17/18; G06F 18/14155
See application file for complete search history.

(56) References Cited

U.S. PATENT DOCUMENTS

| 4,998,208 A | 3/1991 | Buhrow et al. |
| 6,047,241 A | 4/2000 | Sparago |

(Continued)

OTHER PUBLICATIONS

American Petroleum Institute, Piping Inspection Code: In-Service Inspection, Rating, Repair, and Alteration of Piping Systems. API Publishing Services; API 570, 4th Edition, Feb. 2016; 54-55.
(Continued)

*Primary Examiner* — Tung S Lau
(74) *Attorney, Agent, or Firm* — Thomas J. Kennedy, III

(57) ABSTRACT

Techniques for implementing Bayesian model for refining and petrochemical wall thickness monitoring are presented. The construction of a model may be automated for each piping circuit or piece of major fixed equipment, utilizing, for example, specific component data, historical thickness measurements, inspection practices and related inspection program information. The model contains nodes describing the most significant sources of variability, namely component original thicknesses, wall thickness degradation over time, corrosion rates and thickness measurement error. Bayesian prior distributions are assigned using readily available inspection program information, including assigned damage mechanisms, inspector and industry experience regarding the expected range of corrosion rates and degree of non-uniform corrosion, thickness monitoring practices, including surface preparation and instrument calibration, thickness data recording practices and component original thicknesses based on applicable industry specifications, typical values for size/component combinations or detailed ultrasonic thickness scanning data generated specifically for this purpose.

20 Claims, 17 Drawing Sheets

Related U.S. Application Data

(60) Provisional application No. 62/656,302, filed on Apr. 11, 2018.

(56) References Cited

U.S. PATENT DOCUMENTS

| | | | |
|---|---|---|---|
| 9,228,932 B1* | 1/2016 | Maresca, Jr. | G01N 17/00 |
| 11,262,196 B2* | 3/2022 | Sparago | G01B 21/08 |
| 2012/0089366 A1 | 4/2012 | Huyse | |
| 2014/0110167 A1 | 4/2014 | Goebel et al. | |
| 2015/0310349 A1* | 10/2015 | Li | G06Q 10/04 |
| | | | 706/52 |
| 2016/0109413 A1* | 4/2016 | Bonadies, Jr. | G01N 17/006 |
| | | | 73/598 |
| 2016/0213253 A1* | 7/2016 | Wang | A61B 5/14556 |

OTHER PUBLICATIONS

American Petroleum Institute, Pressure Inspection Code: In-Service Inspection, Rating, Repair and Alteration. API Publishing Services, API 510, 3rd Edition, Apr. 2016; 41-42.

American Petroleum Institute, Risk-Based Inspection of Methodology in Recommended Practice. API Publishing Services, API RP 581, 10th Edition, May 2014; 16-18.

Escobar et al., Degradation Data, Models and Data Analysis. Chapter 13 in Statistical Methods for Reliability Data 1998; 316-342. John Wiley & Sons, Hoboken, NJ US.

Kruschke, Bayesian Approaches to Testing a Point ("Null") Hypothesis. Doing Bayesian Data Analysis: A Tutorial with R, JAGS, and Stan; 2nd Edition, 2015; 336-343. Elsevier/Academic Press, USA.

\* cited by examiner

FAILURE PREDICTION AND ANALYSIS TECHNIQUES

CROSS REFERENCE TO RELATED APPLICATIONS

This application is a continuation of U.S. application Ser. No. 16/382,131 filed Apr. 11, 2019, which claims the benefit of U.S. Provisional Application No. 62/656,302, filed Apr. 11, 2018, all of the above-mentioned disclosures being hereby incorporated herein by reference in their entirety.

STATEMENT REGARDING FEDERALLY SPONSORED RESEARCH OR DEVELOPMENT (Not Applicable)

BACKGROUND

Oil refineries and petrochemical facilities rely on piping systems to transport fluids to and from tankage as well as within and between process units. Most piping systems handle dedicated fluids at prescribed temperatures and pressures. These piping systems may transfer highly corrosive fluids at elevated temperatures and pressures. For example, a refinery hydro-treating process contains piping operating at over 800° F. and 1000 psi. Many refining and petrochemical fluids are flammable and/or toxic, making the consequence of failure (e.g., leakage to atmosphere, exposure to personnel) problematic from a health and safety standpoint. Accordingly, most process units are expected to operate at very high reliability levels for long periods of time (typically 4-8 years) between scheduled shutdowns. In addition to health and safety concerns, unplanned outages due to piping system failures are problematic from a business consequence standpoint. Given the potential safety, health, environmental and business risks associated with piping failures, the condition of piping systems is monitored to accurately project their remaining life and determine safe repair or replacement dates.

Internal corrosion of piping systems is often monitored utilizing ultrasonic (UT) or radiographic (RT) thickness testing, to measure wall thicknesses for selected components at prescribed intervals, over the life of the system.

SUMMARY

A method employing a hierarchal Bayesian technique for wall thickness monitoring is provided, where a model for wall thickness diminishment may be constructed. The model construction may be automated for a particular piping circuit or piece of major fixed equipment, utilizing component data, historical thickness measurements and related inspection information. The method may implement model nodes and include component original thicknesses, wall thickness loss over time, calibration error and measurement location repeatability error. The method may include a Bayesian prior corrosion rate distribution obtained by transforming the expected mean and maximum rates plus the confidence in the maximum rates for the particular circuit, into a continuous distribution. The method may include a Bayesian prior corrosion rate distribution obtained by transforming the limiting internal thinning Damage Mechanisms (DMs) and a measure of corrosion environment severity for the particular circuit, into a continuous distribution.

The method may utilize Bayesian prior distributions for calibration error obtained by assessing facility-specific thickness monitoring practices, including surface preparation and instrument calibration. The method may include a method for producing quantitative probability of failure information through estimation of the intersection of a future, projected thickness distribution lower tail with the established minimum thickness value. The method may use time-dependent corrosion rates, utilizing prior distributions that reflect estimates of relative corrosion rate mean and variance since unit startup. The method may utilize an overarching circuit corrosion rate distribution and hierarchal shrinkage to account for the potential for differences in condition monitoring location (CML) rates.

A method for grouping by CML corrosion rate clusters, to identify zones of potential localized corrosion in a piping circuit, is provided. The method may include CML or EP grouping consistent with localized corrosion trends frequently experienced, based on a circuit's assigned internal thinning DMs, to identify areas of potential localized corrosion in a piping circuit.

A method employing a series of models may be provided. The series of models are evaluated to identify the best-fitting model using a leave-one-out cross validation or similar technique, in order to determine the nature of localized corrosion in the specific piping circuit or piece of major fixed equipment.

A method utilizing credible or highest density intervals for historical thicknesses to validate the design of a piping circuit is provided. The method may employ credible or highest density intervals for historical thicknesses to identify data anomalies or locations indicating the desire for follow-up evaluation. The method may use posterior corrosion rate distribution mean and/or variance parameters, which may be scaled to account for anticipated, future operating conditions.

A method using a Bayesian model for identifying the most probable installed pipe schedule or nominal thickness in a piping circuit or piece of major fixed equipment is provided. The method may utilize a categorical distribution and where candidate schedules or nominal thicknesses are assigned prior probabilities based on facility experience. The method may utilize Bayesian credible intervals for probability of failure used to optimize the number of CMLs or EPs. The method may treat thickness measurements as right-censored data, to accommodate inspection programs where multiple EP thicknesses are taken per CML, yet only the minimum thickness for the CML is recorded.

BRIEF DESCRIPTION OF THE SEVERAL VIEWS OF THE DRAWINGS

The disclosure is described in greater detail below, with reference to the accompanying drawings, in which.

DETAILED DESCRIPTION

Figure 1A:
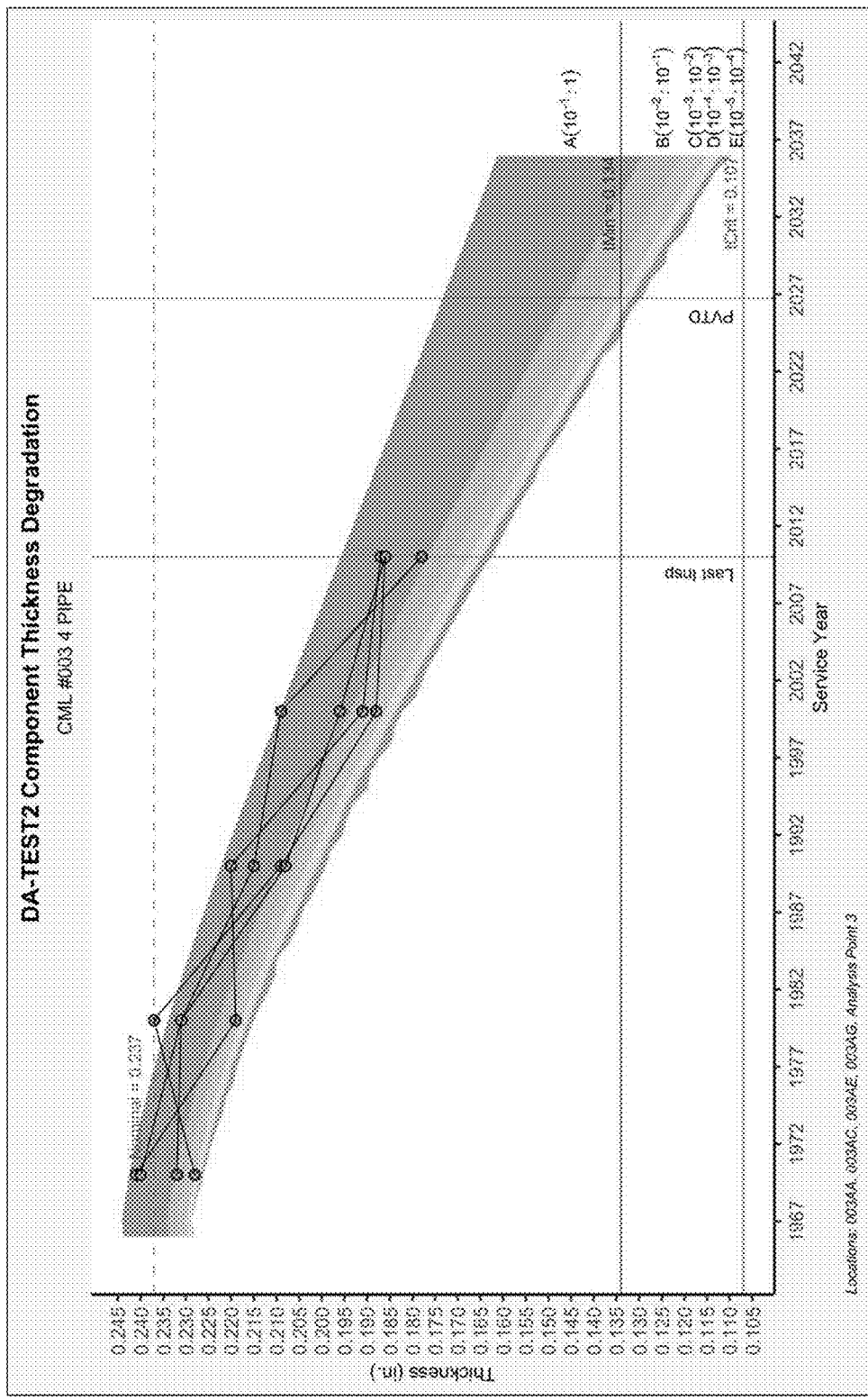
FIGS. 1A and 1B are graphs illustrating thickness degradation paths and modeled thicknesses for CMLs in a piping circuit.

Techniques and implementations for monitoring and predicting wall thickness for piping in oil refineries and petrochemical facilities are discussed herein. In some example techniques, models for a pipe or circuit of pipes are constructed, which construction may be automated.

In a processing facility, measurements are generally taken on every piping system, while a given process unit is operating, making thickness monitoring one of the most labor-intensive and expensive parts of the "on-stream" inspection program. The loss in wall thickness over time is used to generate a corrosion rate, which, in turn leads to a projected date when the wall thickness for a component will reach an established minimum thickness value (t-Min). Follow-up inspections generally become more frequent as components approach t-Min and repairs or replacements are performed prior to the projected t-Min date.

Modern UT thickness gauges may have stated accuracies of +/−0.001", however the overall measurement process for repeated thickness measurements over time, as may be used for corrosion rate estimation, has significantly higher errors due to factors such as surface preparation and reading location repeatability. For the overall UT process, the measurement error can range from 0.005" to 0.030", depending on the component type being measured. These instruments may be capable of taking measurements up to 900° F. although many facilities take "cold confirmation" readings when equipment is shut down, as measurement errors (especially when making comparisons to prior readings) may become unacceptable for readings taken at elevated operating temperatures. Such unacceptable errors can occur even when a "hot calibration" is performed.

Radiographic measurements are obtained by manually scaling the image on the RT film when using conventional radiography, or when using digital radiography, by selecting the wall thickness of interest via a mouse on a computer screen. Both conventional and digital RT use comparison to a known calibration thickness exposed on the same image. Both also call for interpretation in reading the density at the edge of the component wall being measured, as there is rarely a 'sharp' edge, conducive to obtaining highly repeatable measurements. It is not uncommon for readings interpreted by different technicians to vary +/−0.01", exclusive of the inspection location differences over time. When utilizing RT, higher-temperature readings are generally obtained by placing insulation material under the radiographic film (conventional RT) or reusable digital media (digital RT), which may adversely affect the technician's ability to accurately measure wall thickness based on density differences.

Wall thicknesses obtained via UT are generally considered most cost-effective and therefore represent the largest volume of refinery inspection data, however, RT offers the advantage of viewing a representation of the component wall over the length of the film, allowing the technician to identify and record the minimum thickness included in the exposure. For this reason, RT is generally the preferred technique for up to 8 Nominal Pipe Size (NPS) or sometimes 10 NPS components when localized corrosion is suspected.

In order to facilitate thickness data acquisition and analysis, piping systems are commonly divided into piping 'circuits', where each circuit is believed to comprise a common corrosive environment. This circuit concept facilitates the use of a larger thickness data sample size in a statistical analysis. As such, an ideal piping circuit is expected to experience a single distribution of corrosion rates.

A refinery may have thousands of circuits, totaling hundreds of thousands of condition monitoring locations (CMLs). Each CML contains one or more examination points (EPs), generally taken at various orientations around the component. Within a facility, there may be over a million thickness measurements for all EPs and historical thickness surveys.

Generally, circuits are designed on a process flow diagram (PFD), which provides a broad overview of the circuit boundaries. From the PFD, circuits are extended to the piping and instrument diagram (P&ID) level, for more precise routing, interconnections and boundary definitions. Finally, inspection isometric drawings are created for each circuit.

CMLs are rarely marked in the field, but instead are shown on inspection isometrics. Thus the isometric drawings provide a CML 'roadmap' for field use. An experienced inspector with knowledge of potential DMs for the specific circuit generally assigns CMLs, with consideration given to inspection access. In the context of thickness monitoring for internal corrosion, a DM is specific to the corrosive species present in a process stream and the nature of the resulting corrosion. Most facilities have DMs assigned for piping circuits; these DMs are often used to determine the number of CMLs, the number of EPs per CML and the inspection technique(s) employed for a specified circuit.

During thickness inspections, the inspector is responsible for instrument calibration, surface preparation, locating CMLs in the field and to the extent possible, taking measurements at the same EP locations as previously inspected. On non-insulated circuits, there may be evidence as to the precise EP (e.g., paint may be chipped/filed or some ultrasonic couplant may still be visible from the previous inspection). On insulated circuits, there may be inspection ports cut for inspection access, which can improve repeatability by helping to more precisely locate the EPs.

Despite control of important thickness measurement variables, significant errors can occur. Such errors can be on the same order of magnitude as wall thickness losses due to internal corrosion, depending on the actual corrosion rate, time between inspections and thickness uniformity of the components being inspected. These measurement errors are compounded by traditional corrosion rate calculations, and can adversely affect the accuracy of the projected life of a circuit and re-inspection programs or specifications. Currently, there is no known commercial analysis process that specifically isolates and estimates the measurement errors for UT or RT thickness measurements.

The corrosion environment may also experience significant variability, even for well-designed circuits. Sources of corrosion rate variability within a circuit include the following:

1. Long-term process trends: Feedstocks and operating conditions may vary widely over the life of a process unit. Older refinery units for example, often processed less corrosive feed and/or operated at lower temperatures for many years, ramping up to more aggressive (most notably higher sulfur) feeds, often accompanied by higher operating temperatures in later years. On other units, such as certain chemical plant processes, the unit operation and feedstocks remain fairly consistent over the life of the unit. Plant operating personnel often know these historical trends, allowing the information to be used in conjunction with thickness data to better describe the relationship of equipment corrosion rates vs. time. In general, corrosion rates over the life of a unit are not constant and do not vary linearly due to these long-term process trends. Current corrosion rate analysis techniques, however, whether calculated using long/short-term rates, as defined below, or through linear regression (a more advanced process sometimes employed) assume consistent corrosion rates over the span of historical data. As is the case with measurement error, this rate variability can produce inaccurate remaining life estimates and re-inspection schedules.

2. Short-term process variations: It is not uncommon for process units and their piping systems to experience day-to-day flow rate, temperature and feedstock changes. These variations are often caused by (a) normal fluctuations in the unit's process control systems, (b) feed changes caused by switching storage tanks (c) intentional blending of feedstocks or (d) a response to numerous instrument set point changes made in the course of maintaining product quality. Depending on the circuit DMs, these changes in flow, temperature and feed may cause variability in the corrosion rate at specific EPs, at different CMLs or perhaps over the entire circuit. In order to simplify the notion of a corrosion rate, it is usually reported as a single value (e.g., 2 mils/yr, where 1 mil=0.001 in.), rather than correctly defining rates with their associated uncertainty. For a given mean corrosion rate, the variance due to short-term process variations may be very low or very high, each prompting a different repair strategy, a different inspection schedule, and perhaps different inspection technique. Current thickness data analysis processes may estimate the mean rates with reasonable precision, but they do not reflect variances experienced from short-term process variations.

3. Vents, drains, low-flow, no-flow areas: Flowing pipe components experience corrosion rates that are more predictable and generally less variable than components in low-flow or no-flow areas. It is known that low point drains, for example tend to trap deposits (scale, salts etc.) and moisture and may have higher concentrations of corrosives than the flowing pipe. High point vents similarly may trap corrosive vapor in otherwise liquid-filled circuits and may experience condensation in vapor circuits due to heat sink effects. In some cases, stagnant zones and dead legs; which experience periodic flow or no flow respectively, may be split out as separate circuits, but this treatment generally occurs only when the corrosion rates are expected to be significantly different in flowing vs. stagnant piping or when a risk threshold is exceeded. There may be measureable differences in corrosion rates for flowing vs. low/no-flow components, even in circuits handling mildly corrosive fluids. Such rate differences make it difficult to perform a circuit-level statistical analysis using current analysis methods. As a result, an analysis process based on a mean corrosion rate, commonly with an inflation factor based on the standard deviation of circuit rates, will underestimate the remaining life for some CMLs and overestimate the life for others. Also note that this type of simplified statistical approach generally assumes corrosion rates in a circuit are defined by a normal distribution, which is typically not the case.

4. Localized corrosion: Despite efforts to define each circuit as a common corrosive environment, many circuits contain some degree of highly localized corrosion. These localized effects may be significant enough to cause an in-service failure. A greater quantity of CMLs is normally assigned for circuits where localized corrosion is suspected, however, unless there is specific historical information indicating the precise location for localized attack, CMLs do not generally identify the most severe localized corrosion in a circuit. In many cases, some evidence of localized corrosion is present at established CMLs but current analysis processes may not highlight these subtle indications so appropriate follow-up inspection can be performed. By contrast, if the overall thickness measurement and corrosion process is properly modeled, one generally finds that historical thicknesses for most CMLs in a circuit follow the model closely, while a small subset of CMLs have thicknesses that are not explained by the model. A review of thicknesses for CMLs that do not closely follow the model often yields valuable information regarding localized corrosion and/or data anomalies. The ability to classify historical thickness as either following, or not following a thickness vs. time model is not a feature of current analysis techniques. Finally, indicators for localized corrosion are not solely present in the most recent survey, therefore an effective analysis process includes all historical data, not just the original (baseline), most recent and previous readings, as is common for most analysis methods.

5. Sub-circuits: circuit designers generally strike a balance between accuracy of the corrosion environment and practical factors such as circuit size and convenient boundaries. Accordingly, most circuits originate and terminate at major fixed equipment (e.g. towers, drums, tanks & heat exchangers). Some circuits however, may pass through a piece of fixed equipment if a significant change in corrosion rate is not expected. In these cases, minor variations in corrosion rate can be expected, as the circuit boundaries are expanded. In other cases, there may be unanticipated changes in corrosion rates;

for example, around control valves (where turbulence is higher or phase changes can occur), at pipe size changes (fluid velocity changes) or at vapor condensation points (ambient cooling). These conditions introduce corrosion environment subpopulations that often appear as variability in corrosion rates. When this occurs, the calculated circuit corrosion rate, (a common feature in many current analysis processes) and the remaining life estimate can be inaccurate. The alternative is to calculate separate CML corrosion rates, however this approach does not take advantage of the circuit concept, as there is often insufficient data for accurate, individual CML rates. One advantage in using the Bayesian, hierarchical thickness-loss model disclosed herein, is that a circuit-level corrosion rate distribution is assigned however, through hierarchal shrinkage, CML-level corrosion rates are constrained by the individual CML data and by the consistency of rates throughout the circuit. This type of model accommodates corrosion rate variations due to sub-circuits while allowing all historical data to contribute to the results.

Measurement errors and corrosion rate variability combine to produce considerable uncertainty in remaining life estimates and re-inspection schedules. Since current analysis methodologies do not provide estimates for these uncertainties, it is common to employ factors of safety as a means to safeguard from in-service failures. Such factors of safety include:
1. Higher t-Min values; often exceeding the thickness rating, for example, minimum required thickness, based on operating conditions and structural integrity.
2. Half-life re-inspection; a common practice whereby a CML or circuit is inspected when half of its estimated life is remaining.
3. Maximum inspection interval; a common practice calling for the next inspection to occur before the end of a fixed time period.
4. Default corrosion rate; a conservatively assigned corrosion rate applied when there is insufficient thickness data at a particular EP in a circuit.

These factors of safety increase re-inspection frequency, often resulting in premature retirement for piping systems. Despite these safety factors, piping systems continue to have the highest failure rate for fixed equipment in the refining industry. More precise modeling for thickness data allows facilities to reduce or eliminate such safety factors while achieving higher reliability levels, since measurement and corrosion rate uncertainties are reflected in the model results.

Immediate benefits of improved modeling are more accurate remaining life estimates (hence fewer in-service failures), reduced inspection costs and extended unit run lengths due to more precise repair or replacement planning. Once the historical corrosion rates have been estimated, it is straightforward to extend the model to project thicknesses for future operation using published corrosion data, rates from a related facility or empirically obtained rates. This extended model can be used to predict changes in remaining life or risk, based on future feedstocks or operating conditions. For example, as oil refineries plan to purchase and blend lower-cost, more corrosive crude oils, the impact of these blends on remaining life can be predicted using a combination of historical thickness data, plus published or similar-service corrosion rate data for the anticipated crude blend. The industry standard governing inspection for refinery piping systems is American Petroleum Institute (API) Recommended Practice 570 Piping Inspection Code: In-service Inspection, Rating, Repair, and Alteration of Piping Systems. API 570 considers the use of 'long-term' and 'short-term' corrosion rates to predict the remaining life of a circuit. A similar series of equations is presented in API 510—Pressure Vessel Inspection Code: In-Service Inspection, Rating, Repair, and Alteration. While the disclosed method focuses on piping systems per API 570, the same principles apply to pressure vessels per API 510. Per API 510 and API 570, remaining life estimates are calculated for each CML within a circuit, using the greater of the long-term and short-term rates. Where:

$$\text{Long Term Rate} = \frac{\text{original thick} - \text{current thick}}{\text{time between original and current thick}} \quad [1]$$

$$\text{Short Term Rate} = \frac{\text{previous thick} - \text{current thick}}{\text{time between previous and current thick}} \quad [2]$$

$$\text{Remaining Life} = \frac{\text{current thick} - \text{required thick}}{\text{greater of long and short term rates}} \quad [3]$$

Normally, a circuit is re-inspected at one-half of the remaining life for the limiting CML, not to exceed the specified or maximum inspection interval (generally 5 or 10 years), depending on the API service class, which is related to the specific process fluid being handled by the circuit.

Some facilities elect to only inspect CMLs or EPs meeting this half-life criterion, rather than the entire circuit. Unfortunately, this CML-level practice may reflect different operating periods for the long and short-term CML corrosion rates defined in equations [1] and [2], making circuit-level corrosion rate calculations inaccurate if the corrosion environment is not consistent over time.

Historically, API 570 has provided minimal guidance regarding statistical analysis of thickness data. The 4th Ed. (February 2016) expands on this language, encouraging statistical treatment of thickness data.

Note that equations [1] and [2] utilize three historical readings for each CML; namely the original, previous and current readings. In practice, there may be many more readings stored in the thickness-monitoring database for each CML. These intermediate thickness surveys are generally not used for corrosion rate and remaining life estimates. Also, this API process does not readily provide quantitative estimates or credible intervals for a circuit's probability of failure. Finally, it is worth noting that API 570 only provides basic, qualitative guidance for the recommended number of CMLs per piping circuit.

API does recognize a Risk-Based Inspection Methodology in Recommended Practice (RP) 581. This RP utilizes a semi-quantitative 'damage factor' in lieu of a data-driven probability of failure. This approach is in contrast to the method disclosed herein, where historical thickness data is combined with key elements from the inspection program to provide a quantitative probability of failure through Bayesian modeling. The resulting, quantitative probability of failure may be directly used on a risk matrix for a risk-based inspection (RBI) program.

The increasing use of RBI, which combines the likelihood and consequence of failure, benefits significantly from the disclosed quantitative probability of failure process. Although the likelihood scales on a risk matrix are commonly stated in qualitative terms, risk matrices also incorporate quantitative scales. Therefore, the disclosed analysis process provides a quantitative estimate for the probability of failure (commonly defined as the probability of reaching t-Min) and this estimate can be combined with the consequence of failure, directly supporting RBI programs. For example, a piping circuit may not be re-inspected until there is sufficient risk to justify the inspection effort. Note that in an RBI environment, circuit re-inspection is not generally bound by the 5 or 10-year inspection interval set forth in API 570. Similarly, a circuit repair or replacement may be deferred until there is sufficient health/safety or business risk to justify the work.

Another important refinery initiative is the assignment of DMs for each piping circuit. Of particular interest are the DMs assigned for internal corrosion. Using these internal DMs in conjunction with current and/or planned, future operating conditions, it is possible to estimate the type (uniform or localized) and degree (approximate corrosion rate) of expected, internal corrosion. For the Bayesian modeling process disclosed herein, such corrosion rate estimates based on DMs allow inspectors to easily assign prior distributions, which, once combined with historical thickness data, produce corrosion rate posterior distributions for the particular circuit.

A challenge for all refinery inspection organizations is that facilities continue to add or modify process units, resulting in increased refinery complexity and more equipment to inspect. As mentioned earlier, process conditions tend to become more severe over time, placing additional inspection burden on limited staffing. While RBI attempts to focus on higher-value inspections, there is still considerable effort spent on thickness inspections for non-corrosive or mildly corrosive circuits. With advanced modeling, inspections can be better prioritized, focusing on higher risk circuits in a more quantitative manner. This increased inspection effort can be offset by minimizing inspections (e.g., the number of CMLs and re-inspection frequency) for low risk circuits.

A method of degradation analysis using hierarchical Bayesian models is discussed herein for refinery and petrochemical equipment thickness data analysis. This method builds upon the basic degradation analysis principles outlined in Chapter 17 of Meeker/Escobar Statistical Methods for Reliability Data (2003). A key feature of the disclosed method is that the Bayesian model specification is built for each particular circuit at analysis time, using (a) piping component data (NPS, component type and all historical thickness readings) present in thickness databases at most facilities (b) corrosion environment information readily available from assigned DMs plus facility and inspector experience and (c) facility-specific thickness data inspection program practices and procedures.

Unlike currently available analysis processes, which are largely based on corrosion rate equations [1] and [2], the disclosed degradation analysis model process utilizes all historical thickness data, provides measurement error estimates, and accounts for corrosion rate and component thickness uncertainty within piping circuits. The method also utilizes the DMs assigned to particular piping circuits, inspector and plant experience, plus related inspection program data as a basis for Bayesian prior distributions. Specifically, the Bayesian, hierarchical model disclosed herein allows inspectors and engineers to use readily available inspection program information to assign a circuit-level, prior corrosion rate distribution. The model takes advantage of hierarchical 'shrinkage' by allowing CML corrosion rates to be constrained by individual CML data and by the consistency of rates within a circuit. This model design offers substantial improvements over current analysis techniques, which either focus on circuit-level corrosion rates or individual CML rates. Since piping circuit design often does not realize its goal of a "common corrosive environment", this hierarchical model design and shrinkage more closely replicates the actual corrosion rate behavior in a piping circuit.

Some types of degradation analysis are known (Meeker and Escobar, 1998). The innovative advantages described herein are based on the use of dynamically constructed models in combination with particular aspects of readily available inspection program information. Examples of such information include circuit-assigned DMs, operating data, industry, company and site-specific historical experience, company and site-specific inspection practices, measurement error contributions, component nominal thicknesses and other relevant data.

Historical corrosion trends are also modeled using the disclosed method. This modeling is accomplished by providing Bayesian priors, representing estimates of relative corrosion severity (mean and variance) since unit startup. These prior estimates are combined with circuit historical thickness readings, to model corrosion rate changes vs. time.

The disclosed method offers significant benefits of improved data validation, localized corrosion identification, quantitative probability of failure in support of RBI programs, optimized CML quantities and more precise inspection planning. Credible intervals for model parameters and for thickness projections are used to quantify uncertainties in the corrosion and thickness inspection processes.

This methodology additionally provides improved inspection planning when process changes are under consideration, as the impact of future, anticipated corrosion rates can be more accurately modeled. This greater accuracy is accomplished by scaling the modeled corrosion rate distribution parameters in accordance with planned changes in process conditions and feedstock. Scaling estimates can be obtained using published data, related trends from similar processes or expert opinion. The impact of the inspection plan can then be estimated prior to implementing the planned changes. In a similar manner, new processes can be modeled and more accurate inspection plans developed prior to unit startup.

Note that while refinery piping circuit examples are used in the disclosure of this methodology, the same principles apply to all types of industrial fixed equipment, such as pressure vessels, heat exchangers, storage tanks and fired heaters.

Figure 1B:
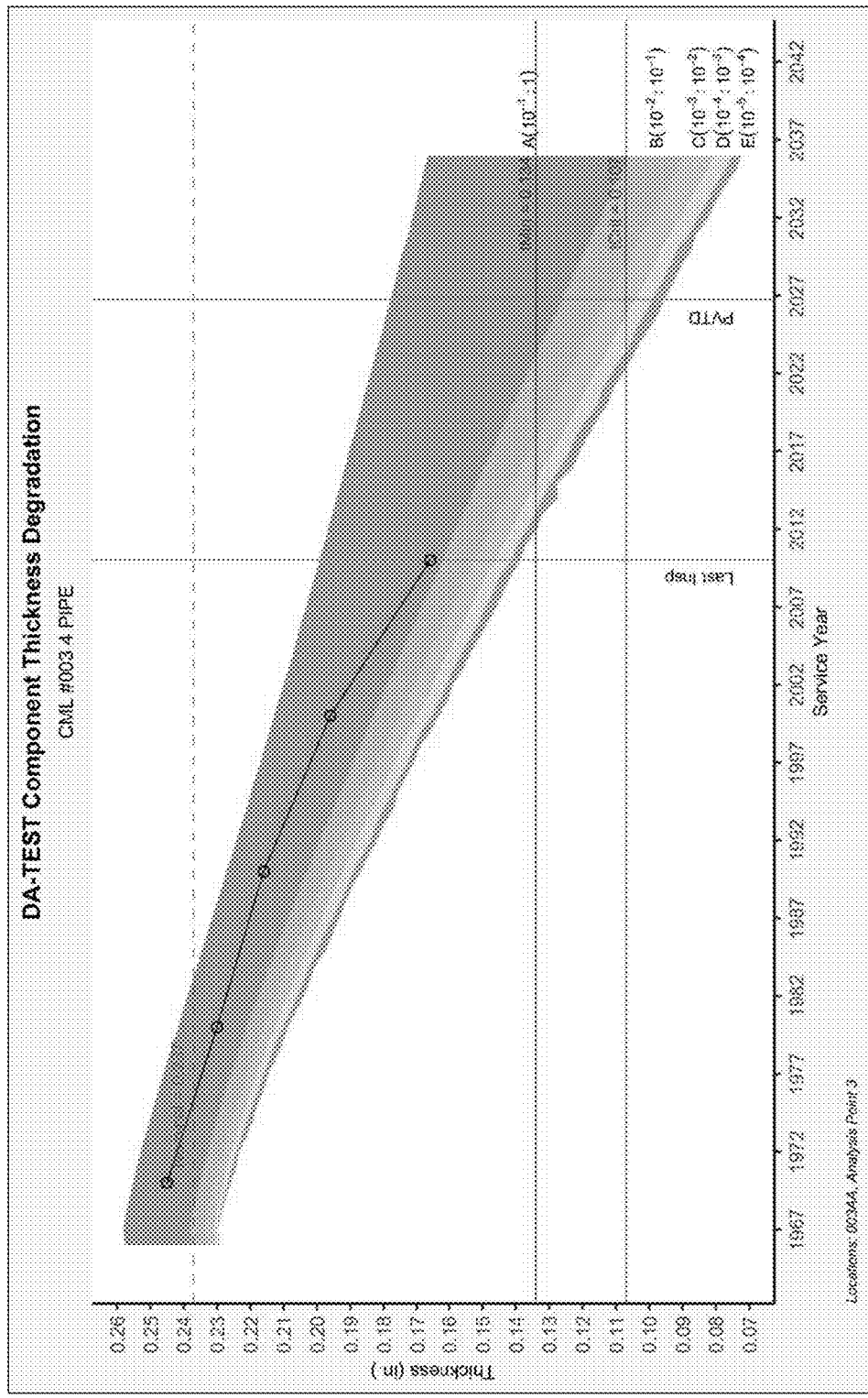

Since the purpose of thickness data analysis is to estimate degradation from internal corrosion as a function of time, degradation analysis offers a helpful solution for the next generation of analysis tools. Degradation analysis models the degradation "paths" of a property (wall thickness) over time. Each circuit contains multiple CMLs, with each CML having one or more EPs. Each of these multiple EPs within the circuit provides thickness loss (i.e., degradation) paths that are modeled through the analysis process. These degradation paths utilize all available, historical thickness data in contrast to known techniques, which typically uses three historical readings to simply calculate 'long-term' and 'short-term' corrosion rates. FIGS. 1A and 1B show examples of refining and petrochemical equipment thickness data modeling using degradation analysis. FIGS. 1A and 1B illustrate examples of degradation paths for EPs associated with two CMLs, superimposed on the model output for each respective CML thickness vs. time. Four historical EPs are shown at a particular CML in FIG. 1A, while a single EP for the CML is presented in FIG. 1B. A plot is created for each CML in a circuit. In these examples, both CMLs experienced corrosion rates of approximately 0.75 mils per year (mpy) at unit startup, increasing to 1.2 mpy in recent years.

The differently shaded ribbons in FIGS. 1A and 1B represent the modeled (posterior) component thicknesses over time for the particular CML. The downward slope of the modeled thicknesses is related to the CML's corrosion rate. This corrosion rate information is shared among all CMLs in the circuit due to the hierarchal nature of the model. Regarding this corrosion rate, note that the modeled thickness distribution experiences curvature during the early years of operation, followed by linear thickness losses. This early curvature is indicative of a lower-corrosion environment during initial operation, increasing to higher, more consistent rates in later years. This model trend, which becomes increasingly important during subsequent probability of failure (POF) calculations, was made possible because prior distributions indicating that corrosion rates were lower and more uniform during startup were assigned. These prior corrosion rate estimates were then combined with historical thickness data to yield the posterior component thickness distributions reflected in FIGS. 1A and 1B.

The multiple EPs per CML in FIG. 1A clearly shows typical scatter in the thickness data, which is evidence of measurement error. Note that some of the measurements exceeded the maximum-modeled thickness for the component. Those higher thicknesses, which actually experienced thickness "growths" relative to their previous readings, are considered to be data anomalies.

A key observation in comparing FIGS. 1A and 1B are the differences in modeled thickness uncertainty, particularly after year 2030. Even though the two CMLs experienced the same corrosion environment since unit startup, the thickness uncertainty is greater when only a single EP is available for a CML, as compared to multiple EPs. This outcome is the expected result, as inspectors recognize that more data tends to reduce uncertainty. A benefit of the disclosed analysis process is that the model clearly and graphically demonstrates the impact of additional data.

The uncertainty trend in FIGS. 1A and 1B represents a useful approach toward CML optimization. For situations where there are already multiple EPs per CML and projected risks are acceptable, individual EPs are removed and the increase in probability of failure (POF) and risk are assessed. This process is repeated until an acceptable risk at specified target date is maintained. For lower corrosion environments, this approach provides fewer EPs for future inspections, while still demonstrating acceptable risk.

Where risks are unacceptable, a related CML optimization process can be employed. If any EPs or CMLs have previously been made inactive, these readings should be reactivated. If risks are still unacceptably high, future surveys with additional EPs and, if necessary, CMLs are modeled based on posterior corrosion rates and component thicknesses. This process continues until either the thickness uncertainty exhibits an acceptable risk at the target date or the level of monitoring becomes impractical. In the latter case, an inspection technique with greater effectiveness (e.g. RT) can be employed or it may be determined that one or more components in the particular circuit should be replaced to achieve the specified risk target.

The disclosed model is based on the simplified relationship between wall thickness, corrosion rate and time as shown in Equations [1] and [2]. When rearranged to solve for future thickness:

$$T_{e_t} = T_{0_i} - r_{e_t} * t_s \qquad [4]$$

Where:
$T_{e_t}$ = Thickness at EP e and service time t (in.)
$T_{0_i}$ = Original EP Thickness for CML i (in.)
$r_{e_t}$ = Corrosion Rate for EP e, at time t (in/year)
$t_s$ = Service time t (years)

In Bayesian modeling (i.e. BUGS/JAGS) pseudo-code, Equation [4] can be expressed as $$T_{e_t} \sim dnorm([T_{0_i} - r_{e_t} * t_s], 1/\sigma_{tot}^2) \qquad [5]$$

Where: $\sigma_{tot}^2$ = Sum of calibration $\sigma_{c_s}^2$ and thickness location repeatabiliy $\sigma_{l_e}^2$ variances (in.), In this disclosed model, $T_{0_i}$, $r_{e_t}$, $\sigma_{c_s}^2$ and $\sigma_{l_e}^2$ are each represented by individual distributions with their own parameters. This is in contrast to Equations [1] and [2], where thicknesses and corrosion rates are represented by discrete values. Equation [5] also provides a term reflecting calibration and reading location repeatability errors. Thus, while the Degradation model disclosed herein is based on traditional corrosion rate calculations, the model is constructed to incorporate major sources of uncertainty in the thickness data and corrosion rate processes; specifically measurement error, component thickness variations and corrosion rate variability.

In Equation [5], the EP thickness at a given point in its service life is modeled by subtracting the wall loss at that point in time from the original EP thickness. The difference term in [5], inside square brackets, is normally distributed with a variance term reflected by the sum of thickness calibration and repeatability terms.

Since each thickness survey is performed with independent calibrations, potentially using different calibration procedures, a calibration variance term $\sigma_{c_s}^2$ is used for each survey. Priors for $\sigma_{c_s}^2$ are given as normal with a mean of zero and standard deviation related to surface preparation and facility-specific calibration practices. Given typical calibration and surface preparation practices, it is common to consider measurement error to be approximately +/−0.005", exclusive of location repeatability error. This translates to a standard deviation range of approximately 0.0017"-0.0025". This range can easily double with poor surface preparation and inconsistent calibration practices. Each facility may assess their specific practices and arrive at reasonable starting values, which are reflected in the appropriate prior distribution.

Note that the model offers the flexibility to utilize larger $\sigma_{c_s}^2$ values for older surveys, if more recent inspections were conducted with improved practices. The preceding discussion relates to spot UT readings. For other types of thickness inspection techniques, the adjustments in Table 1, which are based on field experience, apply.

TABLE 1

Measurement Error Calibration ($\sigma_{c_s}^2$) Prior Distribution Adjustments for Different Inspection Techniques

| Inspection Technique | $\sigma_{c_s}^2$ Adjustment | Reason |
| --- | --- | --- |
| Spot Ultrasonic Readings | None | Included in model |
| Manual Ultrasonic Scanning | ×0.85 Scan-to-scan otherwise none | Lower measurement error when comparing historical scans |
| Automated Ultrasonic Scanning (AUT) | ×0.75 | Consistent transducer pressure, improved surface preparation |
| Profile Radiography | Increase to 0.010" | Manual density judgment |
| Digital Radiography | Increase to 0.075" | Manual density judgment, but better resolution |

For small thickness surveys (considered to be fewer than 16 readings per survey, based on experience), there is insufficient data to provide a reasonable calibration error estimate. The $\sigma_{c_s}^2$ estimate from a preliminary analysis run encompassing all historical surveys is utilized for these small surveys.

Parameter $\sigma_{I_e}^2$ is based on NPS and component type for each EP. The priors are normal with a mean of zero and standard deviation based on the thickness variability for the specific size/component combination as determined from detailed thickness scans from a large number of components. Separate values for $\sigma_{I_e}^2$ are utilized for insulated vs. un-insulated components.

The original thicknesses for each CML ($T_{0_i}$) are taken as gamma-distributed, for the respective CML. The gamma distribution is selected because of its flexible shape, which accommodates components having near-normally distributed thicknesses (such as straight pipe) and component with a higher-thickness "tail" in their distribution (most notably reducers and tees). The distribution of thicknesses in elbow components falls between these two extremes. This CML original thickness distribution is shown in Equation [6].

$$T_{0_i} \sim dgamma(sh_i, ra_i) \quad [6]$$

Where:
$sh_i$=Gamma distribution shape parameter for CML i
$ra_i$=Gamma distribution rate parameter for CML i Both parameters in Equation [6] are dependent on the nominal pipe size (NPS) and component type for each CML within a circuit. These shape and scale parameters are obtained from appropriate transformations based on the mean or mode for the original component thickness. Such transformations facilitate the selection of prior distributions for component thicknesses. As it is both rigorous and convenient to model component thickness priors based on the mode and standard deviation, these transformations are as follows:

$$sh_i = 1 + \mu_{b_i} * ra_i \quad [7]$$

$$ra_i = \frac{\mu_{b_i} + \sqrt{\mu_{b_i}^2 + 4*\mu\sigma_{b_i}^2}}{2*\sigma_i^2} \quad [8]$$

Where:
$\mu_{b_i}$=Component nominal thickness mode (in.)
$\sigma_{b_i}$=Component nominal thickness standard deviation (in.)

Priors for $\mu_{b_i}$ are normal, with a mean equal to the component nominal thickness and broad variance, with suitable adjustments related to the nominal pipe size, to account for greater variability in mean thickness for larger NPS components.

Priors for $\sigma_{b_i}$ are gamma distributed with transformations similar to those performed in Equations [7] and [8] in order to facilitate familiar parameter values (mean and standard deviation). The transformed $\sigma_{b_i}$ mean and standard deviation parameters increase with nominal pipe size and pipe schedule, and are greater for component types in the following rank order: Reducer>Tee>Cap>Elbow>Pipe>Plate. Detailed thickness scanning of many representative piping components has been performed to better define typical component variability and this data is used in assigning these prior distributions.

Since $\mu_{b_i}$ and $\sigma_{b_i}$ are both dependent on the original, nominal wall thickness, an important element of the disclosed method is to define the installed pipe schedule for components at each CML. Within a facility, piping specifications generally govern the specific pipe schedules (which relate to the nominal wall thickness) installed for original construction and for maintenance repairs. The specified pipe schedule is usually, but not always, installed. Differing schedules, either higher (greater nominal thickness) or lower may be installed due to availability, fabrication errors or intentional deviations from the specified pipe schedule. For example, a replacement schedule may be deliberately increased to provide additional corrosion allowance. As shown in FIG. 1, this originally installed pipe schedule specifies the baseline thicknesses for the analysis; therefore it is of vital importance to determine the installed schedule in order to accurately predict future thicknesses.

A separate process, which includes another Bayesian model, is used to determine the installed schedule at each CML, as it is difficult to positively identify this schedule for many (particularly for pipe fitting) components, due to wide thickness tolerances. From an analysis standpoint, these tolerances are especially challenging for components produced by different manufacturers, but may even be problematic for components produced at different times by the same manufacturer.

The process to determine the installed pipe schedule for a component at each particular CML is as follows. Linear regression corrosion rates are initially used to roughly estimate wall losses since installation. These wall loss estimates are added to measured thicknesses, providing approximate prior thickness distributions for each CML. A preliminary analysis using these approximate priors generates modeled corrosion rate estimates for each CML; this is the same preliminary run used to estimate the circuit overall calibration variance described earlier. These preliminary corrosion rates are used to refine the installed pipe thicknesses and schedules for each CML.

The resulting pipe schedule estimates may be in error; the actually installed component may be one schedule higher or lower. Additional information provided by the specified piping specification and the facility's experience with both conformance to this specification and with replacement practices become the prior distribution for a Bayesian analysis. For example, it is reasonable to expect that the specified pipe schedule was installed 80% of the time. If the circuit is an older piping system, which may have had component replacements in the past, the specified schedule was like likely installed on the order of 60-70% of the time ($p_{specified}$=0.6 to 0.7). This range can be customized for a particular site or unit to develop prior probabilities of a particular pipe schedule for any component. For example, in the case where the specified schedule is believed to have been installed 60% of the time, with equal probabilities that one higher or one lower schedule was installed, the model pseudo code for categorical parameter (BUGS/JAGS dcat( ) distribution) prior probabilities is:

Modeled Schedule~dcat(priorSchedule[ ])      [9]

priorSchedule[1]<-0.60 # Schedule 80 Pipe (specified)
priorSchedule[2]<-0.20 # Schedule 40 Pipe (lower)
priorSchedule[3]<-0.20 # Schedule 160 Pipe (higher)

Baseline thickness estimates from the process described earlier become the data, referred to as Est. Thickness in likelihood Equation [10].

$$\text{Est. Thickness} \sim dgamma\left(\frac{\mu_{base}^2}{\sigma_{base}^2}, \frac{\mu_{base}}{\sigma_{base}^2}\right) \quad [10]$$

As before, the gamma distribution is used to describe component thicknesses in [10]. This equation includes appropriate transformations for the gamma distribution to be written in terms of more familiar component mean and standard deviation parameters $\mu_{base}$ and $\sigma_{base}$. These two parameters take on values based on the three, candidate pipe schedule categories shown in Equation [9].

The model including statements in Equations [9] and [10] yields posterior probabilities for component nominal thicknesses based on historical CML data. The overall process of iteratively screening the thickness data to provide corrosion rate to estimates, obtaining pipe schedule estimates, followed by the application of a Bayesian categorical model that includes prior probabilities based on piping specifications and facility experience, is a vital step in the disclosed analysis method.

An important feature of the disclosed method is that the model for each circuit is customized to reflect the specific component types and sizes (NPS) present in the particular circuit. For this reason, the specific model employed for each circuit is built dynamically at analysis time. Fortunately, the information used to construct the model is readily available in most piping circuit thickness databases.

With the original component thicknesses $T_{0_i}$ properly modeled as described in the preceding sections, the corrosion rate at each particular EP, $r_{E_t}$ is the next term in Equation [5]. Corrosion rates are modeled as a gamma distribution, which has the flexibility to approach a symmetrical, normal shape, ideal for uniform corrosion environments, or a long-tailed shape for localized environments. Another advantage of the gamma distribution is that, as seen earlier, it can be readily re-parameterized to provide familiar model parameters. Since corrosion rates may not be consistent over the life of a unit, the disclosed model fits a variable rate for a period of time, approaching a more stable, asymptotic rate during the more recent surveys. Rate Adjustment factors reflect historical changes in both rate mean and variance.

The RateAdj parameters in Equation [11] are factors reflecting the relative corrosion rate behavior (RateAdj$_\mu$ and RateAdj$_\sigma$) since unit startup. If only the mean rate is believed to have changed for example, then RateAdj$_\mu$ may be reviewed or otherwise addressed. Generally, operating and/or inspection personnel in a facility have a historical perspective that allows them to provide these priors with reasonable accuracy. Historical thickness data then tunes the parameters to produce the most likely rate adjustment posterior distributions.

$$r_{E_t} \sim dgamma\left(\frac{[\mu_r * RateAdj_\mu]^2}{[\sigma_r * RateAdj_\sigma]^2}, \frac{[\mu_r * RateAdj_\mu]}{[\sigma_r * RateAdj_\sigma]^2}\right) \quad [11]$$

A simple and useful relation for corrosion rate trends over time is shown in Equation [12]. This relation only has two parameters and models a typical case when rates are either lower or higher during early years of unit operation, approaching a more stable rate in later years.

$$RateAdj_{\mu/\sigma} = RateAdj_{0\mu/\sigma} * e^{RateAdj_i * t} \quad [12]$$

In [12], RateAdj$_0$ applies to each of the $\mu$ and a parameters while RateAdj$_1$ is a common parameter for $\mu$ and $\sigma$. These parameters are normally distributed priors with mean as the appropriate RateAdj estimate per facility personnel, and a broad variance.

Prior distributions for the corrosion rate mean ($\mu_r$) and standard deviation ($\sigma_r$) in Equation [11] can be assigned using one of several techniques, depending on the inspector's or engineer's experience in combination with available inspection and process information. Experienced personnel can often estimate the circuit expected mean and maximum rates, along with the degree of confidence in the maximum rate. These prior distribution decisions are often made after consideration of the internal DMs, inspection experience, process conditions and materials of construction. It is straightforward to transform the mean and maximum corrosion rate estimates into a continuous gamma distribution using Equation [11], once the degree of confidence in the environment is translated to a quantitative value representing the occurrence level for the maximum estimated rate. For example, if three levels of confidence in the maximum rate estimate are available, a related occurrence level can be established per Table 2.

TABLE 2

Occurrence Levels for Estimated Maximum Corrosion Rate

| Confidence in Corrosion Rates | Occurrence Level For Maximum Rate |
| --- | --- |
| High | 0.99 |
| Medium | 0.95 |
| Low | 0.90 |

Figure 2:
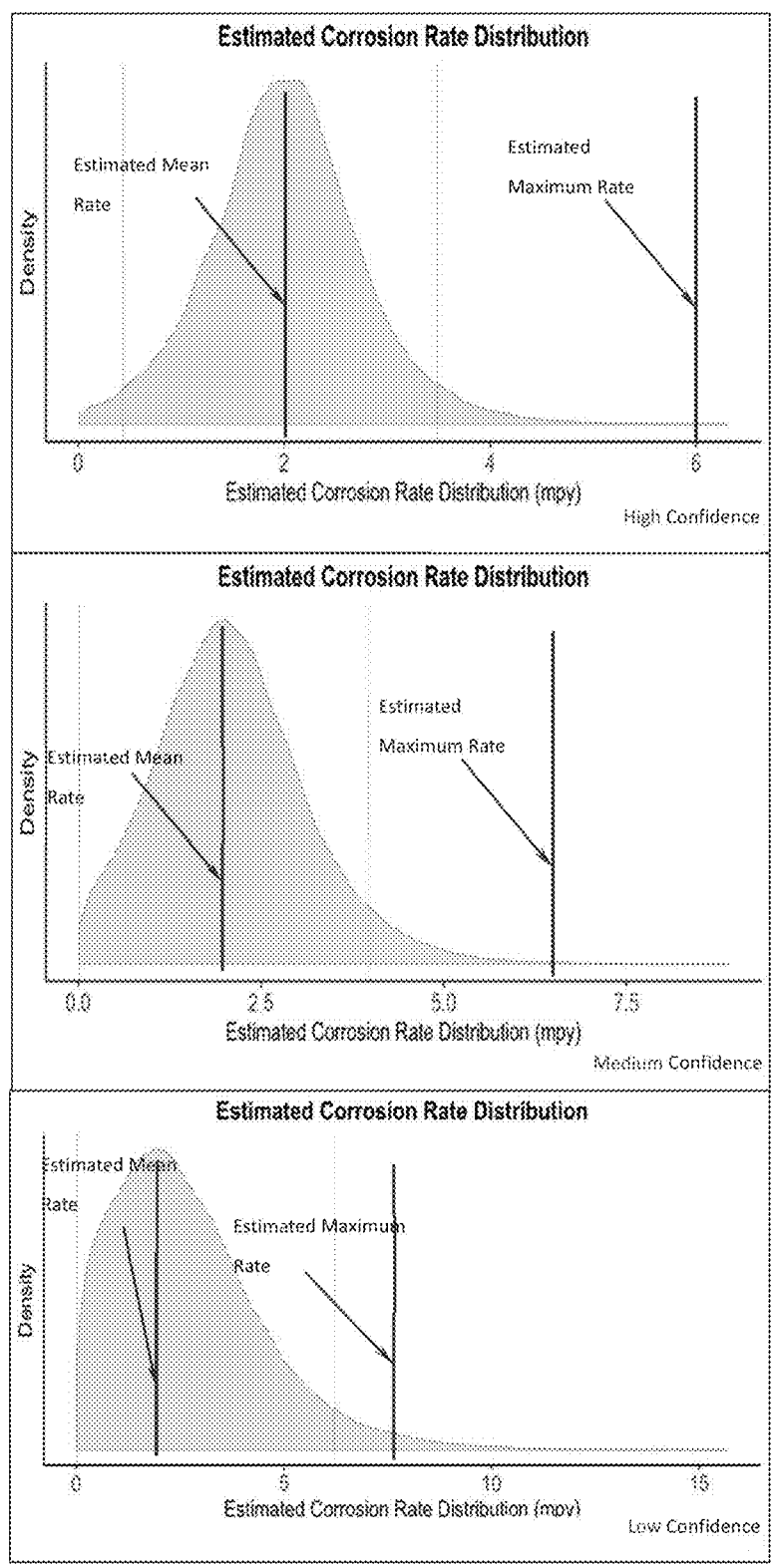
FIG. 2 is a series of graphs illustrating corrosion rate prior distributions based on estimated mean and maximum rates, for different confidence levels.

Given estimates for the circuit mean and maximum rates and confidence levels assigned per Table 2, the corrosion rate prior distributions, such as those shown in FIG. 2 for three different confidence levels can be assigned.

It is alternatively possible to assign useful corrosion rate prior distributions without specific corrosion rate knowledge once the internal DMs are known and given a categorical expectation of the corrosion environment severity. Table 3 provides examples of mean and maximum rates that can be used as prior distributions for several refinery internal DMs. As before, these selections can be combined with the confidence/occurrence values from Table 2 to assign appropriate corrosion rate prior distributions.

Note that the two preceding methods for assigning corrosion rate prior distributions represent straightforward approaches using readily available inspection information and do not require knowledge of the underlying statistics. Other data sources, such as published, plant/company-specific or industry data can also be used in the assignment of corrosion rate priors.

Parameters for the disclosed model, reflecting the relationships shown in Equations [5] through [12] and with prior distributions assigned in accordance per the procedures outlined above, are estimated using standard Gibbs or Hamiltonian Monte Carlo techniques. The typical results presented in FIGS. 1 and 3 through 9 reflect intuitive and informative graphical output made possible due to the rich information provided by the model parameters and their uncertainties using the disclosed Bayesian model.

Figure 3:
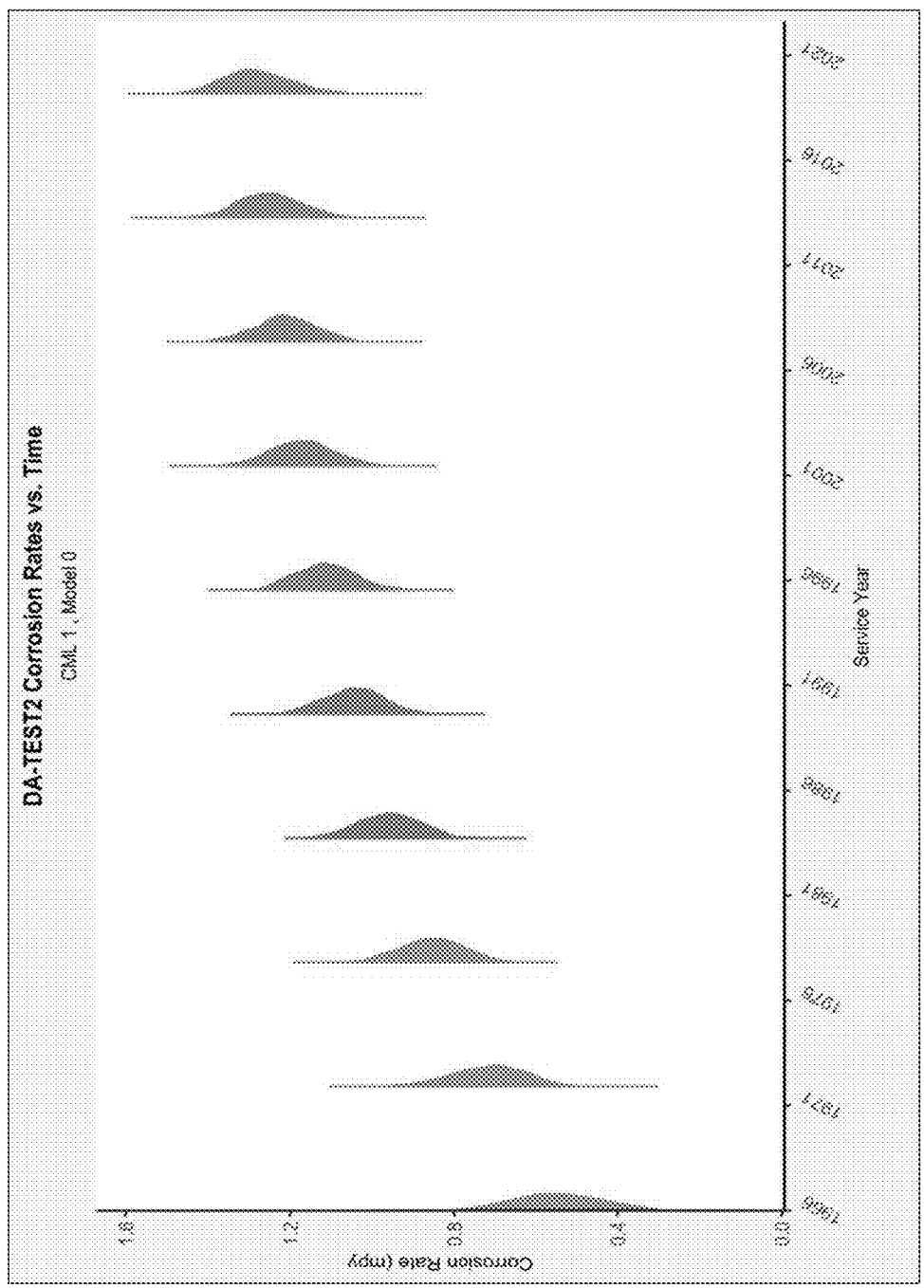
FIG. 3 is a graph of CML corrosion rates vs. time, as modeled in accordance with example implementations of the analysis process discussed herein.

FIG. 3 shows typical, posterior corrosion rate vs. time probability densities, exhibited by many refining processes where feedstock and operating conditions produce higher rates in later operating years.

TABLE 3

Typical Mean and Maximum Corrosion Rates Based on Internal DMs and Environment Severity, mpy

| Primary Internal Damage Mechanism | Mean/Maximum Rates, mpy Expected Corrosion Environment | | |
|---|---|---|---|
| | Mild | Moderate | Severe |
| Uniform | 2/4 | 2/5 | 2/8 |
| Ammonium Bisulfide/Alkaline Sour Water | 3/5 | 3/7 | 3/10 |
| Ammonium Chloride | 5/7 | 5/10 | 5/15 |
| High Temp $H_2/H_2S$ Corrosion | 5/7 | 5/9 | 5/12 |
| Hydrofluoric (HF) Acid Corrosion | 4/6 | 4/8 | 4/12 |
| Naphthenic Acid | 5/7 | 5/10 | 5/15 |
| Other Localized | 3/5 | 3/6 | 3/8 |

Recognizing that piping circuits may not reflect the ideal "common corrosive environment", the degradation model incorporates the concept of hierarchical shrinkage. This is an important aspect of the disclosed method because corrosion rates may, or may not be consistent throughout a circuit. The assigned corrosion rate priors and the posterior distributions in Equation [11] are considered to be overarching corrosion rates for the entire circuit. If posterior rates are estimated to be relatively consistent, then rates are shrunken toward the mode of the overarching Corrosion rate.

The analysis process offers two safeguards for cases where one or more CMLs experience different corrosion rates than the remainder of the circuit. The first safeguard is that hierarchical shrinkage will only 'shrink' CML corrosion rates toward the mode when these rates are estimated to be consistent within a circuit. If there is convincing evidence in the historical thickness data that specific CML(s) are not part of the common corrosive environment, those particular CML corrosion rates will not be shrunken to match the bulk of circuit, but will instead have their own, individual corrosion distribution(s).

The second safeguard against variable and/or inconsistent CML corrosion rates in a circuit is made possible by classifying CMLs or EPs as those either that do, and do not fit the model. The subset(s) of CMLs or EP that do not adequately fit the model either represent data anomalies or unexplained thickness losses or growths. Usually, it is unexplained losses that are of interest. A review of thickness residuals (posterior modeled estimates less actual thickness measurements) quickly reveals CMLs and EPs that may receive a manual review and/or follow-up examination. This residuals review and follow-up process provides a rigorous and formal means for identifying potential areas of localized corrosion.

Figure 4:
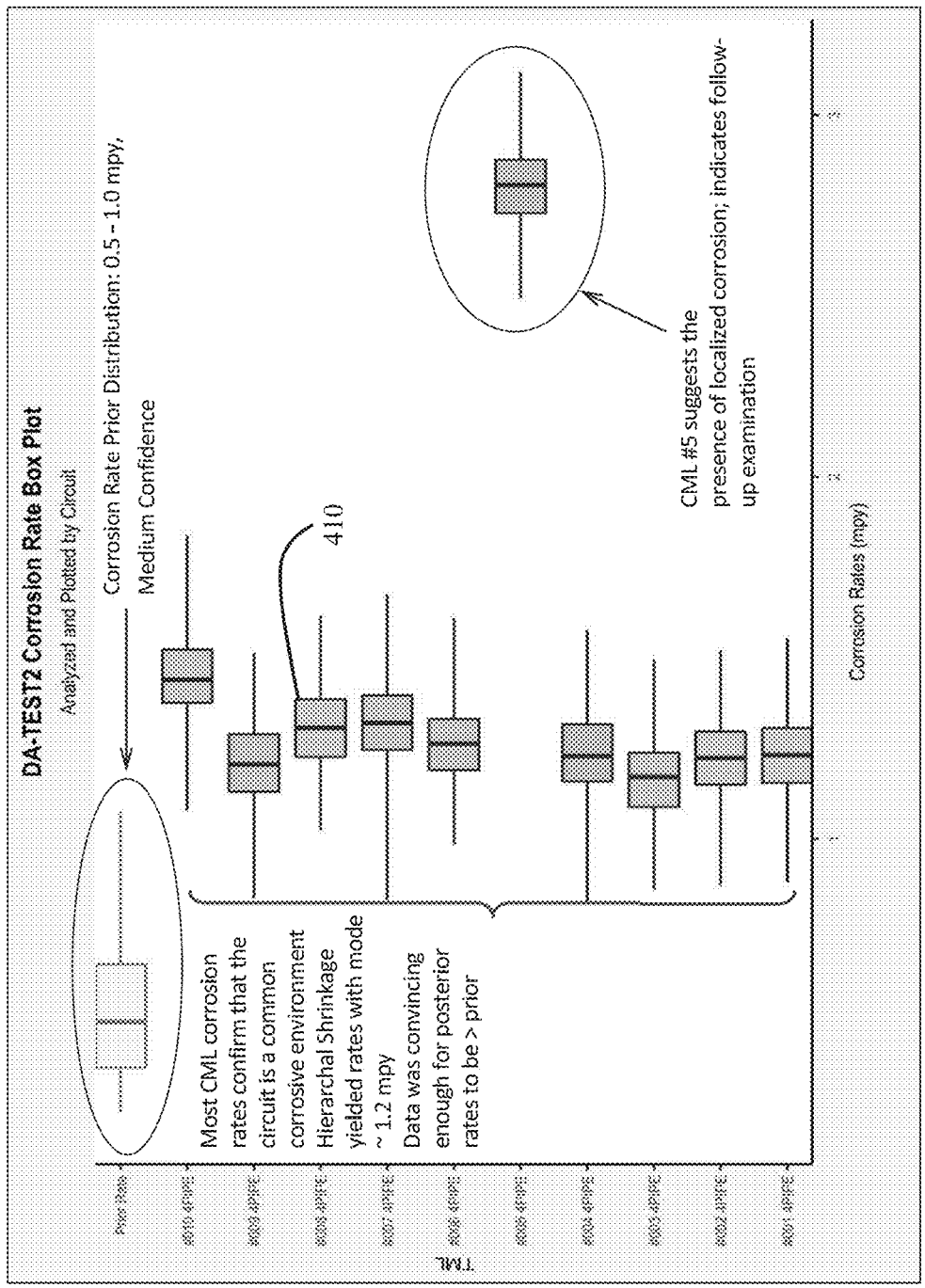
FIG. 4 is a graph illustrating a corrosion rate box plot showing typical CML rates in a piping circuit with localized corrosion at one CML.
Figure 5:
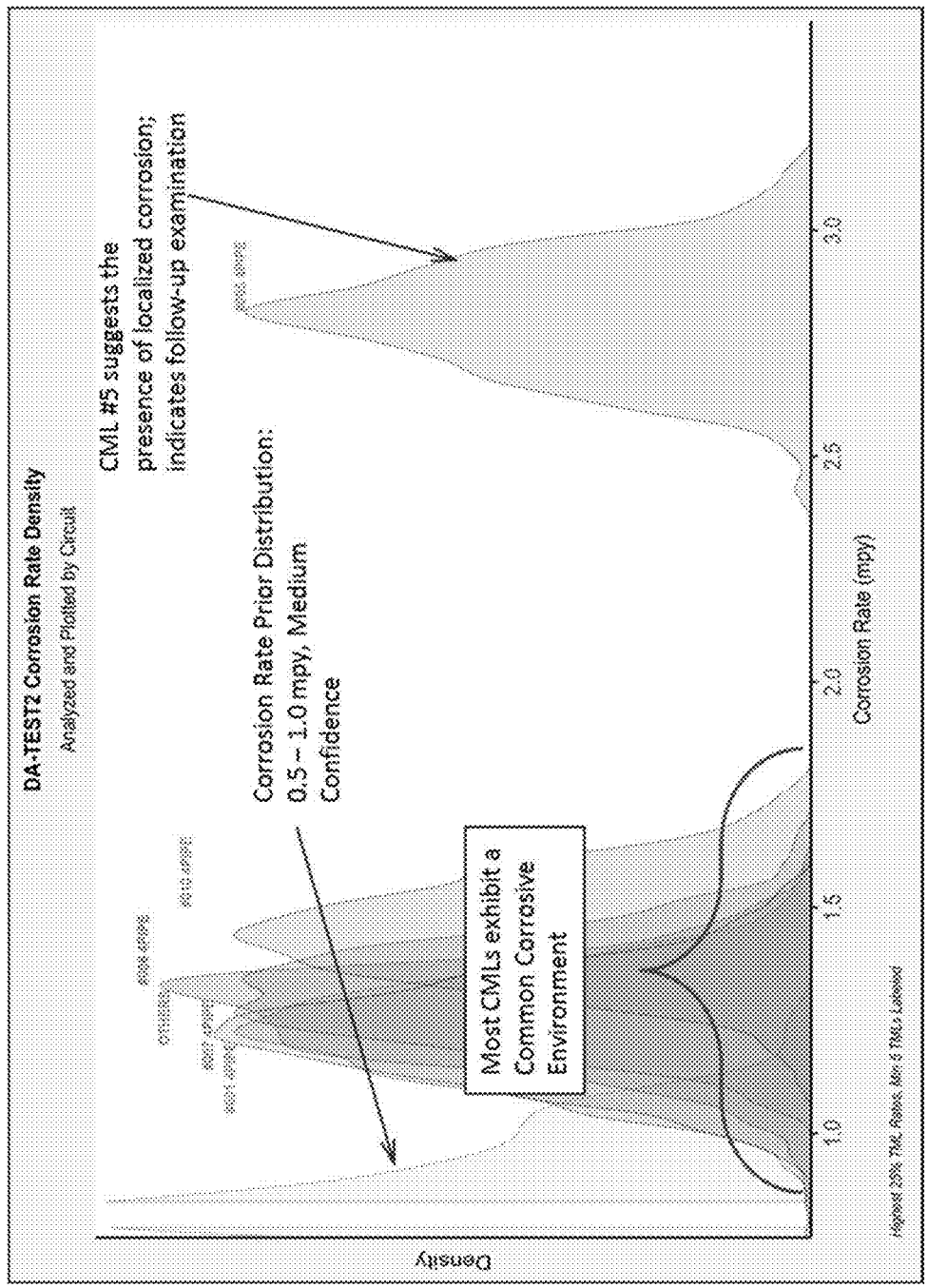
FIG. 5 is a graph illustrating a corrosion rate probability density plot showing CML rates in a piping circuit with localized corrosion at one CML
Figure 6:
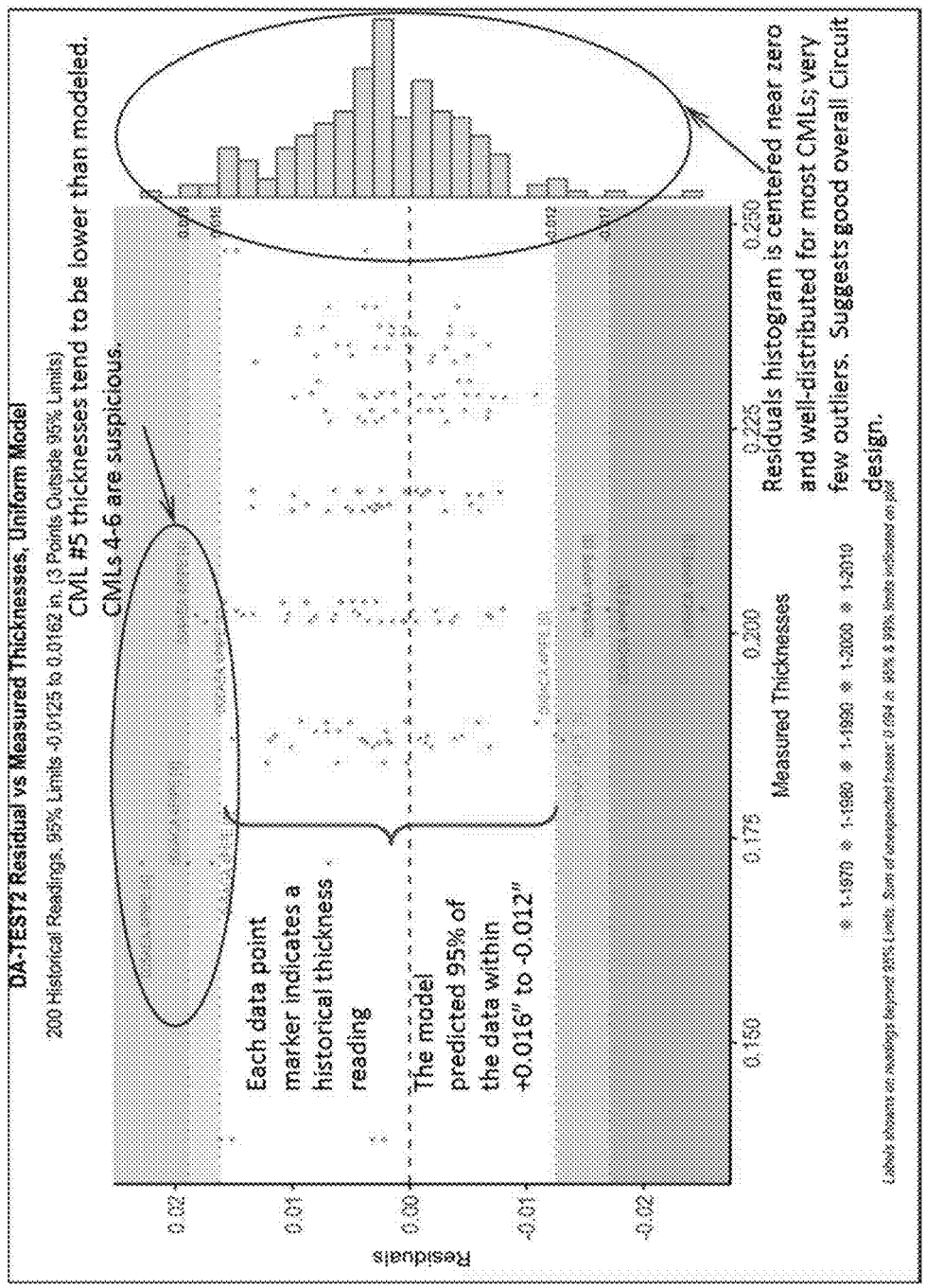
FIG. 6 is a graph illustrating an example of a piping circuit thickness residuals plot showing sound circuit design and several EP outliers prompting further review or follow-up inspection.
Figure 7:
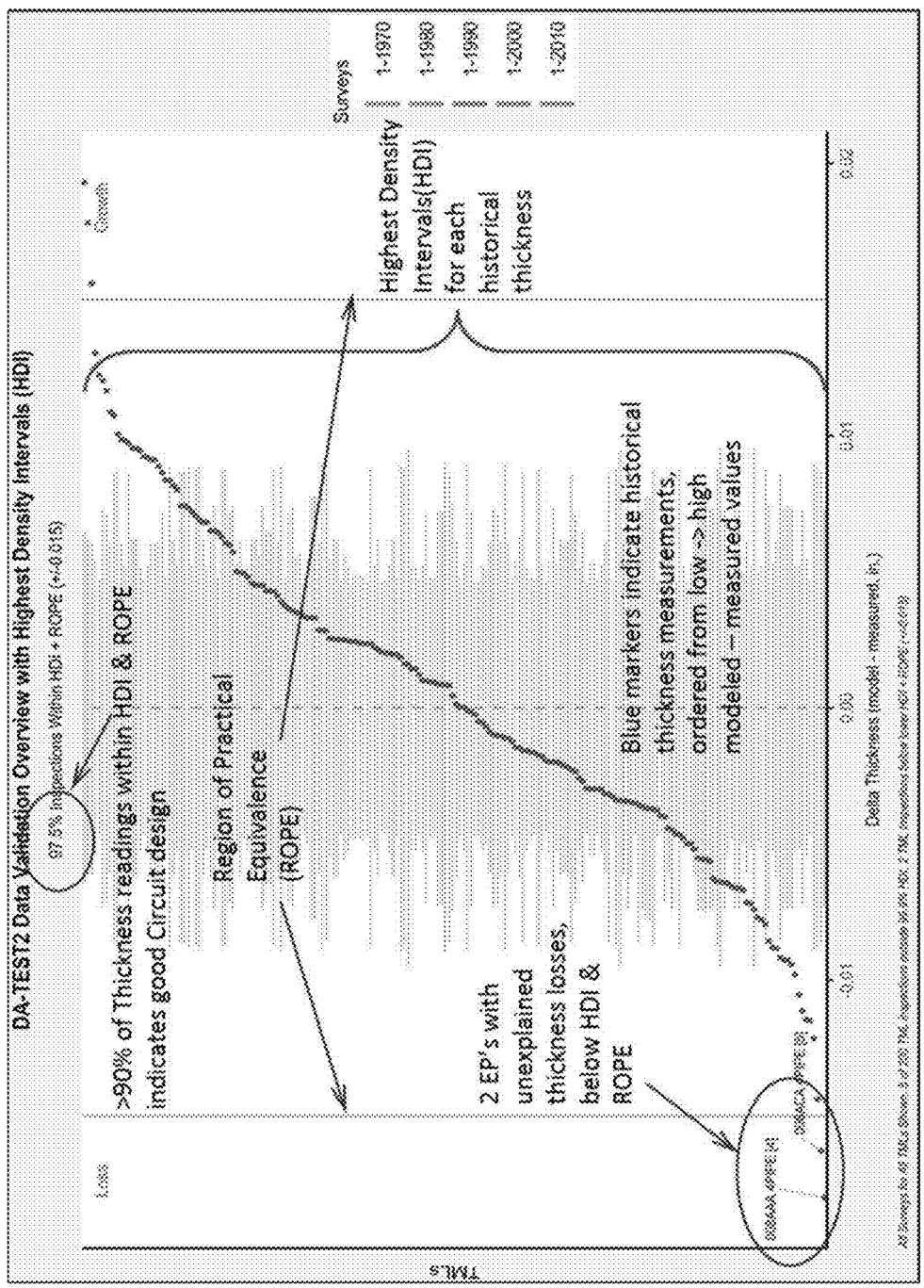
FIG. 7 is a graph illustrating a thickness data validation plot showing highest density intervals for historical thickness data and Region of Practical Equivalence (ROPE).

Using the disclosed method, the role of the corrosion rate prior distribution, the effects of hierarchal shrinkage and the safeguards against variable/inconsistent corrosion rates are demonstrated in FIGS. 4-6.

FIG. 4 is a corrosion rate box and whisker plot showing CML corrosion rates for an example circuit. The different boxes depict the rates for each CML and box 410 indicates the prior distribution. In this example, the overarching prior rate was assigned with a mean rate of 0.5 mpy and a maximum rate of 1.0 mpy; there was a medium degree of confidence in the corrosion environment. After applying the disclosed Degradation Model in combination with historical data, the posterior corrosion rates were found to be somewhat higher than the prior, at approximately 0.75-1.75 mpy for most CMLs. With the exception of one CML (#5), the circuit rates were shrunken to the modal values of approximately 1.25 mpy due to hierarchal shrinkage. For CML #5, the data was sufficiently convincing to overcome shrinkage, producing CML rates in the 2.5-3.25 mpy range. This increased rate for CML 5 appears relatively minor, but the analysis clearly indicates a difference in the corrosion environment, suggesting a higher probability for localized corrosion. Appropriate follow-up inspection can now be focused on this CML, using UT scanning or RT techniques. This follow-up examination may reveal even higher rates than those predicted by the historical thickness data samples.

Similar results are revealed on the posterior probability density plots shown in FIG. 5. This depiction also clearly shows the separate, corrosion rate distribution for CML 5, suggesting the presence of localized corrosion, and demonstrating the relationship to the assigned prior and the impact of hierarchal shrinkage in the Bayesian model.

While the disclosed model correctly identified the CML corrosion rates and potential areas of localized corrosion, as exhibited in FIGS. 4 & 5, there are minor thickness losses that were not fully explained by the analysis process. These residuals (modeled thickness less measured values) are displayed in FIG. 6, where the residual is plotted for each historical thickness measurement. For a perfectly designed circuit in an ideal corrosion environment and with predictable measurement error for each thickness survey, residuals would be zero at every measurement. In practice, residuals are expected to be normally distributed, centered at zero. This is the case in FIG. 6, which shows most of the thickness residuals clustering around zero and 95% of all historical thickness data for the circuit ranging between +0.016" and −0.012". This not only indicates that the model accurately predicted the measured thicknesses, but also validates the circuit design.

Of particular note in FIG. 6 is that CML 5 exhibited some of the highest unexplained thickness losses, wherein the model could not fully explain some of the low thickness measurements obtained. It is also worth noting that CMLs 4 and 6 also had some unexplained losses. If CMLs 4 through 6 are truly consecutive (i.e., adjacent) in the field, this suggests a potential zone of localized corrosion, supplementing the information obtained from FIGS. 4 & 5, where it was presumed that only CML 5 was experiencing localized attack.

Model results and resulting parameter uncertainties facilitate the validation of a circuit's design. If a circuit is properly designed and appropriately modeled, a majority of historical thickness readings (say, greater than 90%) should be accurately modeled; specifically measured thicknesses will fall within the 95% highest density intervals (HDI) and an appropriate Region of Practical Equivalence or ROPE, per Kruschke (2015), *Doing Bayesian Analysis, Second Edition*. While FIG. 6 provides an qualitative indication for this circuit design verification, a more direct and quantitative method is to plot the residuals (modeled less measured values) for all historical thicknesses along with their respective HDI, to examine how the circuit thickness data aligns with the HDI and ROPE. Thickness readings below their expected values can indicate localized corrosion, sometimes resulting from improper circuit design. Note that this criterion of >90% historical thickness readings can be used as a formal definition for satisfactory circuit design, as no formal definition currently exists. Outlying readings, i.e. outside the HDI limits, can be viewed as data anomalies or may represent localized corrosion.

Such anomalies are focal points for follow-up examination, as they represent thicknesses that were not accurately modeled after consideration of measurement error and other uncertainties. An example of this approach appears in FIG. 7, where >90% of the ordered residuals for all thickness historical data appears within the HDI and the ROPE of +/−0.015", validating the circuit design. Several outlier readings, labeled with their CML number, NPS, component type and sequential thickness survey number represent potential locations for follow-up examination.

In contrast to currently available thickness data analysis technology, the disclosed method has (1) identified CMLs with predicable corrosion rates (2) suggested a zone within the circuit which could be problematic in the future and (3) conveyed these results in a straightforward, graphical, manner, rather than presenting the inspector with numerical output in a spreadsheet format. These results are made possible due to the rich information provided by the Gibbs or Hamiltonian Monte Carlo techniques used to estimate model parameters and their uncertainties from the disclosed Bayesian model.

Once the CML corrosion rate parameters and their uncertainties are available, future component thickness distributions are also estimated. Generally, thickness projections are desired for dates up to or slightly beyond the next scheduled unit shutdown, or other repair/replacement opportunity. An example of these thickness projections is shown in FIG. 8, as a series of probability densities.

Figure 8:
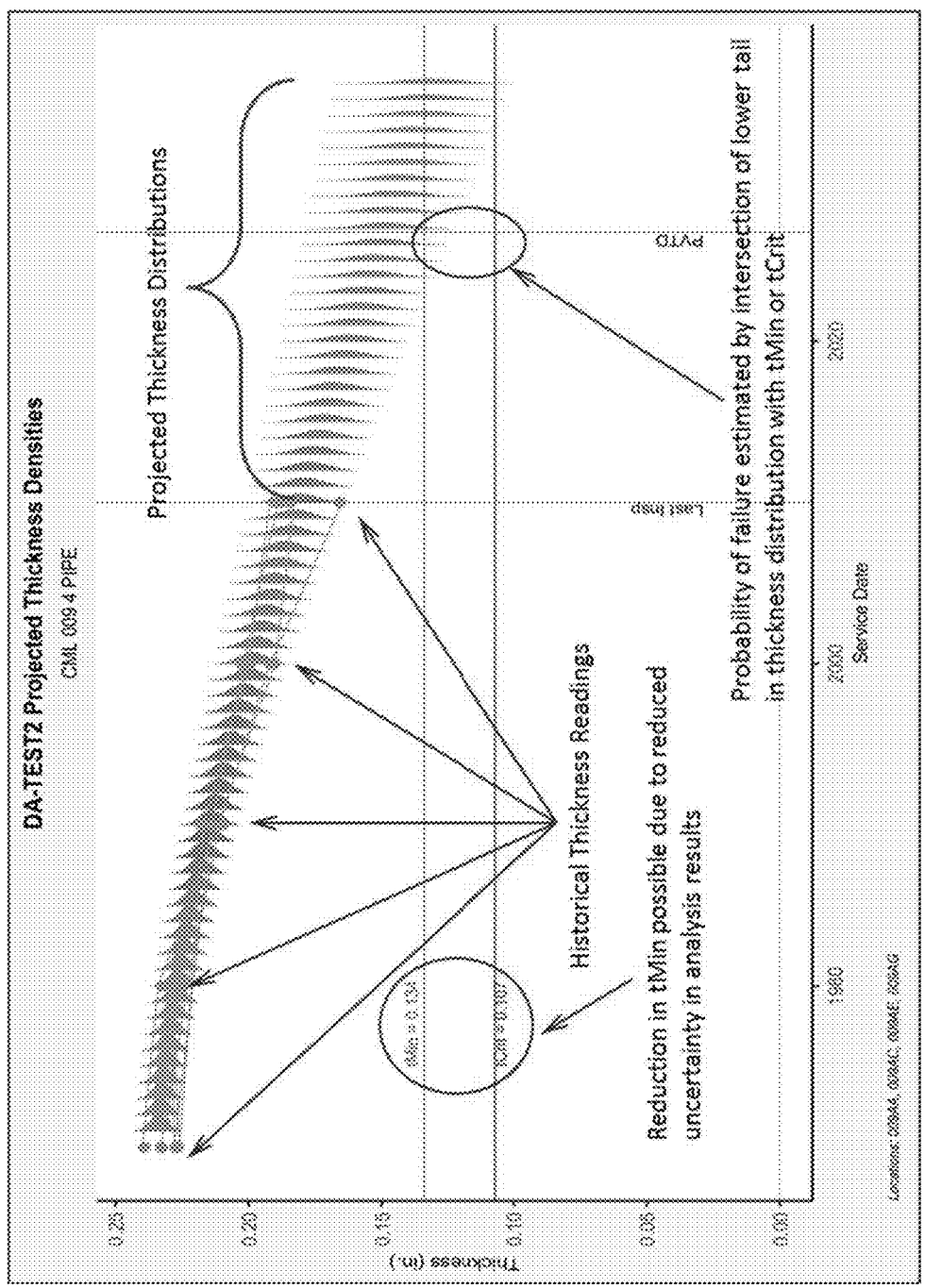
FIG. 8 is a graph illustrating CML projected thickness densities, probability of failure estimation and tMin reduction potential using degradation analysis.

FIG. 8 also demonstrates how the probability of failure is estimated based on thickness projections and the established t-Min value. At any point in time, the proportion of the CML thickness distribution lower tail that intersects t-Min can be estimated using Monte Carlo techniques based on modeled, posterior parameters. This approach provides the probability of reaching that specified t-Min value. Some facilities refer to this as the probability of 'failure', as the component fails to meet specifications, for example, a specified thickness or a minimum required thickness.

In most cases, a breach of the pressure envelope (i.e., leakage to atmosphere) does not occur at t-Min. Since the disclosed method provides more accurate projections, including estimates of the component thicknesses and corrosion rate uncertainties, there are opportunities to reduce traditional t-Min values to the lower t-Crist', as shown in FIG. 8). As discussed previously, t-Mins usually have factors of safety to account for uncertainties in the corrosion rate and thickness projection results. Using the disclosed degradation analysis process, t-Mins can be safely reduced, to values approaching a specified thickness, for example a minimum required thickness, based solely on pressure retention and structural integrity.

Figure 9:
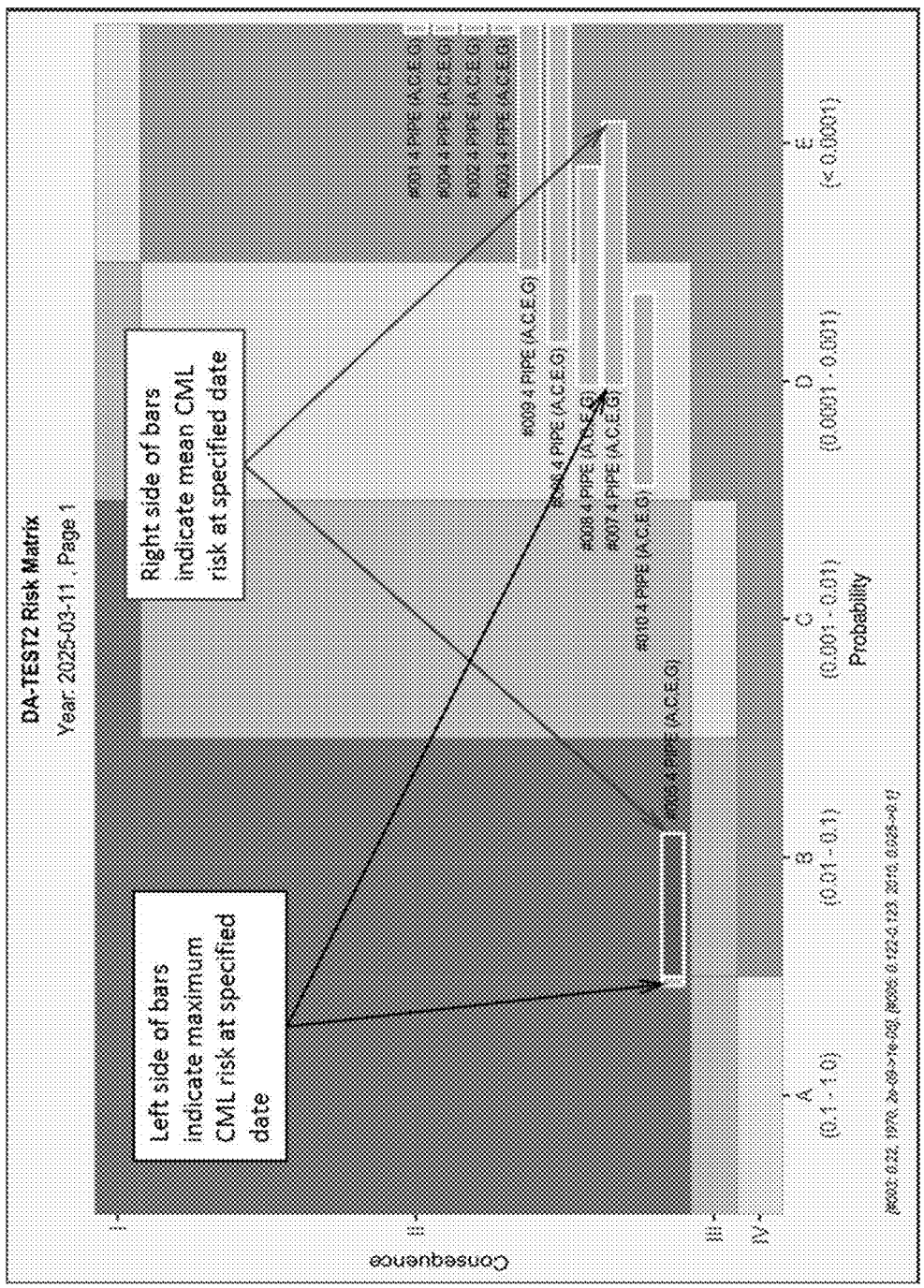
FIG. 9 is a graph illustrating CML risks in a risk matrix, with uncertainties for a piping circuit, as modeled by the disclosed analysis process.

Once the probability of failure has been estimated, it is straightforward to show CML risks at any point in time on a typical Risk Matrix. Since parameter estimates for the disclosed model include uncertainties, risks can be described with their related uncertainties as well, based on 95% highest density intervals (HDI). These HDI-based credible intervals include the combined effects of the model parameter uncertainty as well as the quantity and quality of historical data. This represents a unique feature of the disclosure, as most risk-based outputs report a single estimated risk, without consideration for uncertainty Typical Risk Matrix output is shown in FIG. 9. Note that in this example, CML 5, which had the highest corrosion rate, also has substantially higher risks in year 2025 than all other CMLs in the circuit.

Figure 10A:
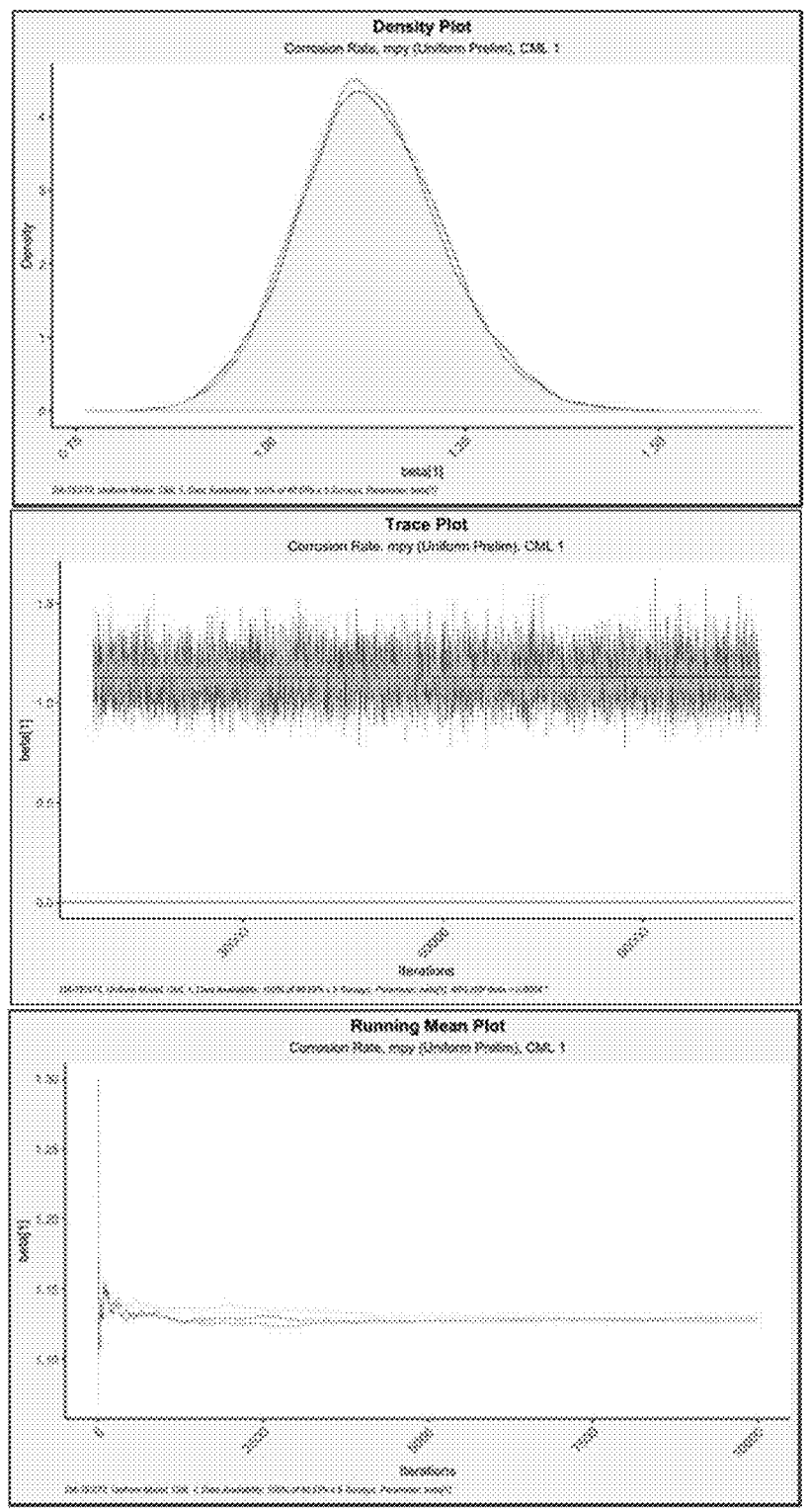
FIGS. 10A and 10B are graphs illustrating a corrosion rate cluster analysis plot, showing a zone of localized corrosion within a piping circuit.
Figure 10B:
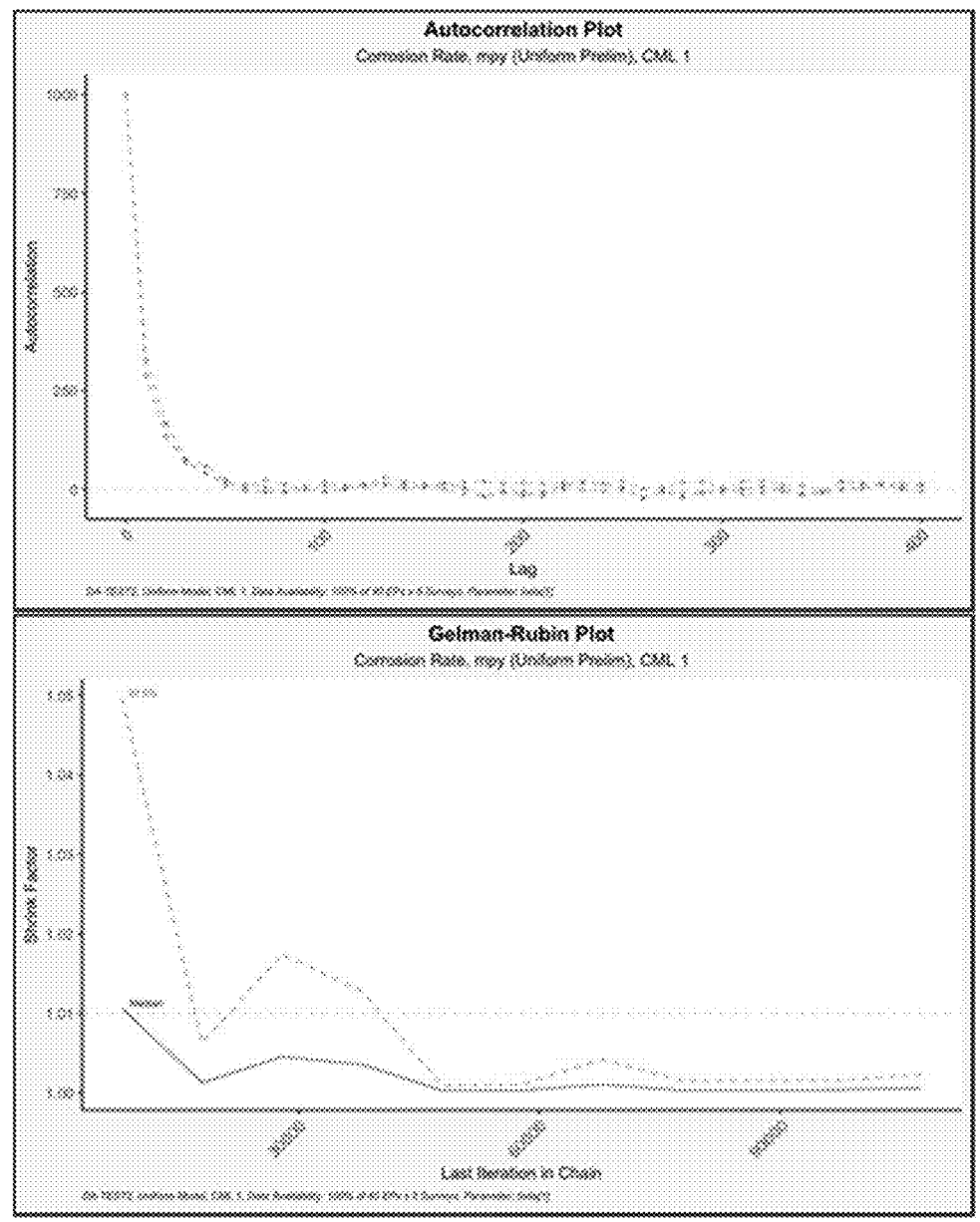

At the conclusion of the MCMC process, parameter convergence is assessed using typical practices for Bayesian models, including preparation and review of trace, density, autocorrelation and Gelman-Rubin plots. Sample diagnostics plots from one parameter in the disclosed analysis process are shown in FIG. 10. A similar family of plots is prepared for each parameter used in the model.

A review of the risk matrix and accompanying plots described earlier may reveal the following about the particular circuit or CMLs within the circuit:
 1. No further inspection is required for an extended period of time
 2. CMLs within the circuit have potential for localized corrosion or other significant data anomalies indicating follow-up examination
 3. CMLs within the circuit have an unacceptable risk, indicating immediate follow-up examination Normally, this review process occurs without any formal analysis, however there may be cases where higher risks can be mitigated through the use of additional CMLs, EPs or the use of inspection techniques with greater inspection effectiveness. Conversely, as discussed earlier, there may also be opportunities to reduce CMLs or EPs during subsequent inspections for circuits where current inspection data have demonstrated low risk. This evaluation process is generally referred to as "CML optimization".

If it is desired to perform CML optimization on the particular circuit, the thickness degradation model is modified to test various cases with fewer or additional CMLs/EPs or techniques, depending on the specific goals. This optimization process essentially employs posterior predictions using simulated data, based on the corrosion rate and thickness distribution parameters from the previously discussed degradation model. This CML optimization process is outlined in FIG. 15.

Other important features of the disclosed analysis method include the following:
 1. Models can be easily modified to include considerations for operational interruptions such as mothball periods. Mothballing refers to periods of time when a circuit is not in service; sometimes drained and/or purged with an inert gas to prevent internal corrosion. During mothball periods, corrosion is assumed to either be arrested or rates may be somewhat different that from normal operation depending on circuit blinding and preservation procedures. If a circuit was mothballed, this time period and the estimated corrosion rate while mothballed (which may be zero) can be estimated and incorporated into the model. This additional information significantly improves the accuracy for the probabilities of failure.
 2. Many times, the installation date for a circuit or a given CML is known, however, if only a rough estimate of the installation date is available, this estimate and the degree of certainty can be transformed into a prior distribution in the model. By default, it is assumed that all components in a circuit are installed at the same time (i.e., the service life for all components are identical). If inspection records indicate different installation or replacement dates for different components, these dates can be incorporated into the model as well.
 3. Uncertainties for model parameters as reflected in their credible intervals are reduced when more CML, EPs and surveys are present. In many cases, a facility will record every measurement taken, providing the best results with the narrowest credible intervals. Some facilities however, measure multiple EPs per CML, but record fewer readings (e.g., the minimum EP reading at each CML). This practice is sometimes done to minimize effort in field recording and to reduce data entry. Using current analysis techniques, when readings are taken but not recorded, there is considerable uncertainty in the result. When only the minimum reading is recorded in the disclosed model, the previously discarded readings are treated as right-censored data. In this manner, the model can accommodate this 'reduced data' inspection practice, to more closely reflect the true state of the equipment and the parameter uncertainty. For example, if four EPs were taken on a CML with readings of 0.23", 0.22", 0.22" and 0.21", the analysis input would be 0.21", plus three readings >0.21". This censored data approach is not available using current analysis methods.

Figure 11:
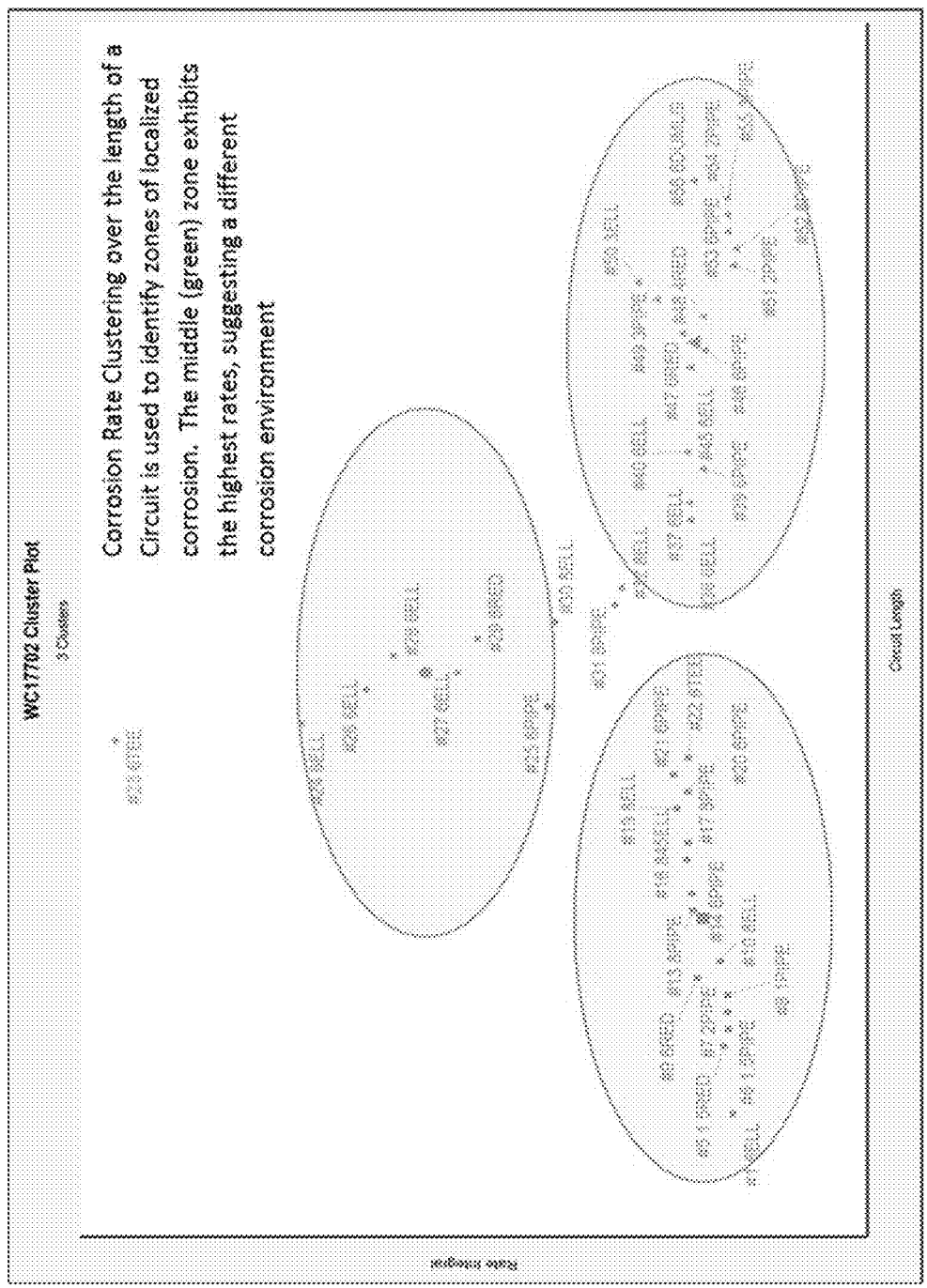
FIG. 11 is a graph illustrating a corrosion rate cluster analysis plot, showing a zone of localized corrosion within a piping circuit.

4. Model fit may be improved (i.e., lower residuals obtained) by combining higher-rate CMLs according to corrosion rate clusters. The disclosed model tests the ability of such clustering (typically 2-3 clusters within a circuit) to improve model fit, as determined by the leave-one-out cross validation method. If this process identifies an improved model fit, then separate corrosion rate parameters are estimated for each cluster. Valid clustering is indicated by EPs or CMLs with common features (same component, size or orientation) or CMLs that are approximately sequential. The rates used for this clustering are the EP or CML rate sums from the Monte Carlo simulation, which are effectively numerical integrals of the modeled rates. An example of cluster grouping for a circuit is shown in FIG. 11. This plot shows how circuit CMLs have been grouped into corrosion rate clusters. For the example FIG. 11, CMLs within the higher (green) cluster ellipse on the vertical "Rate Integral" axis indicates the presence of a localized corrosion zone within the circuit. When a clustering of this nature occurs, an improved model fit is observed and the cluster grouping best represents the corrosion environment for a circuit. These cluster grouping cases become additional models in the analysis process. When localized corrosion is present, but not widespread over the entire circuit, experience has shown that one of these cluster groupings often becomes the optimum model.

Similar to the clustering strategy indicated above, model fit may also be improved by grouping CMLs according to trends typically experienced based on the circuit's DMs. For example, DMs that are more dependent on fluid velocity, such as corrosion by ammonium bisulfide or naphthenic acids, tend to promote accelerated corrosion at turbulence locations created by elbow and certain tee configurations. Low-flow circuits such as flare lines and designs that produce stagnant conditions may experience accelerated corrosion at low points where salts and deposits may cause under deposit corrosion. When such localized DMs are present, a more targeted model is additionally tested per the specified CML grouping. There may be several potentially appropriate groupings for each circuit, depending on the DMs and the circuit design. In these cases, multiple models, each with different CML groups are run and the best-fitting model is selected through the use of leave-one-out cross validation. This grouping strategy is similar to the Corrosion engineering Model's grouping approach utilized by the Method of Selective Corrosion Rate Analysis: Sparago, (1997), Method of selective corrosion rate analysis for a fluid processing plant, U.S. Pat. No. 6,047,241A.

Figure 12:
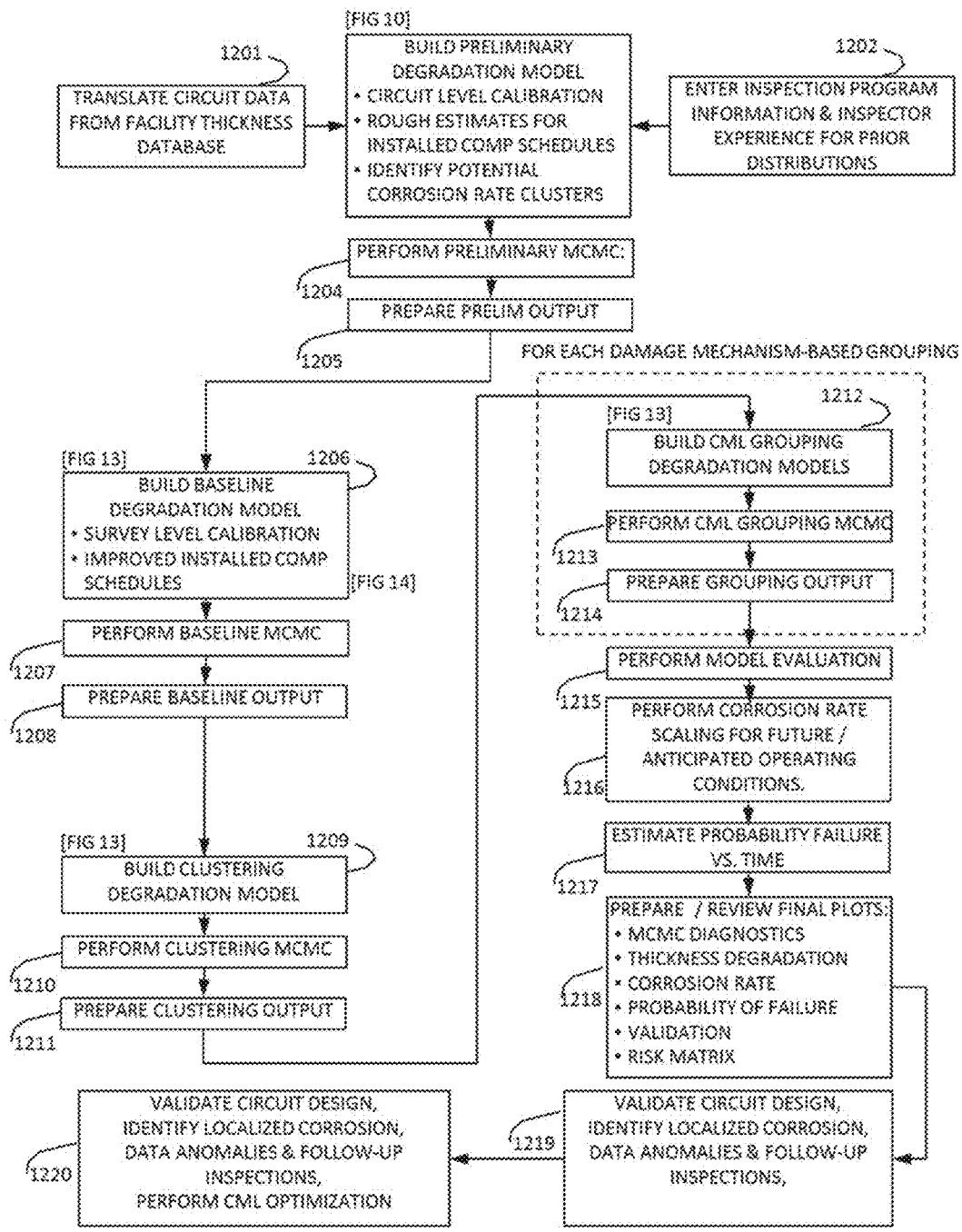
FIG. 12 is an overview flow chart of a thickness data degradation analysis process.
Figure 13:
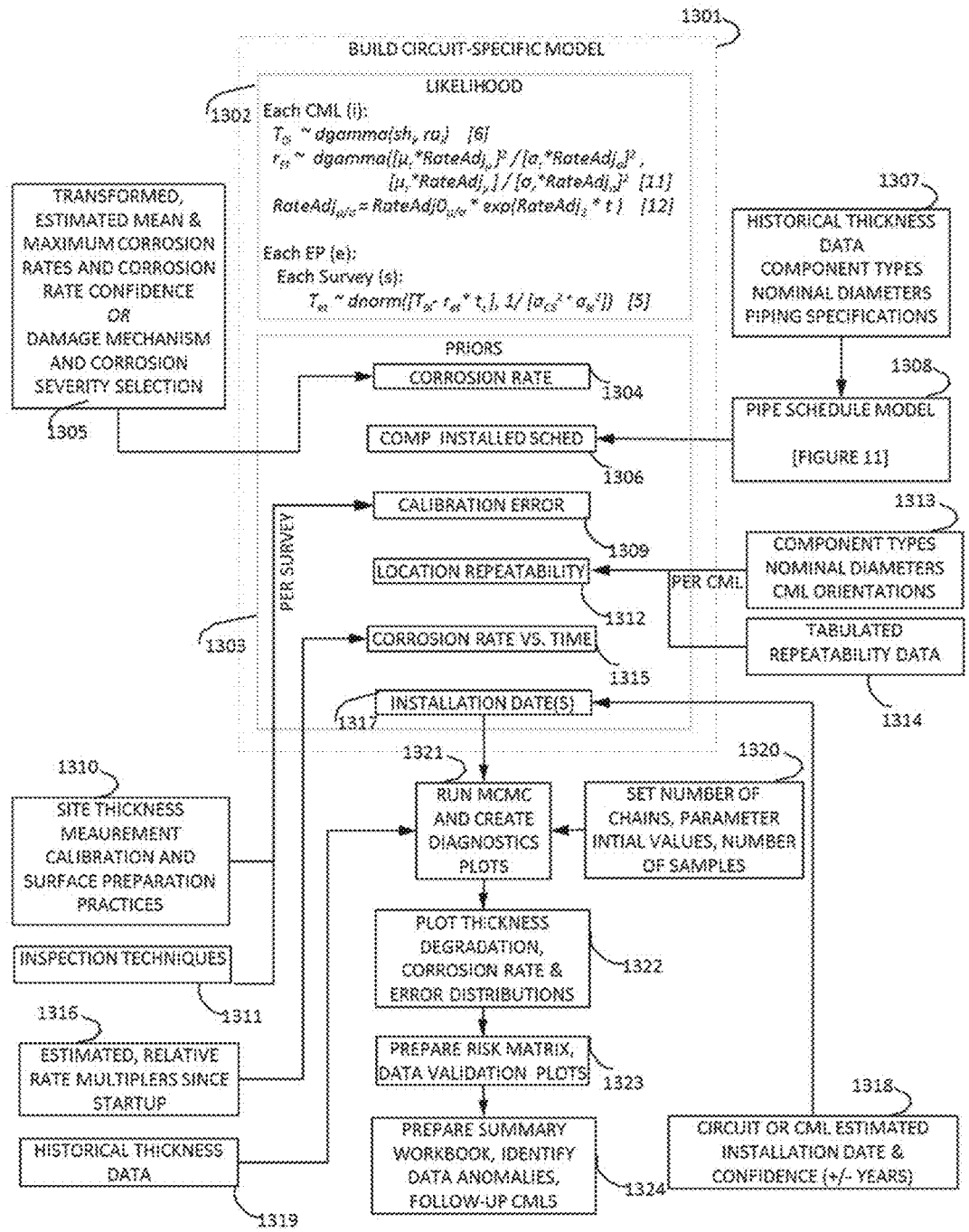
FIG. 13 is a flow chart illustrating a thickness data degradation analysis process showing the model-building steps and in particular, how readily available inspection program data is used to formulate prior distributions for the Bayesian model.
Figure 14:
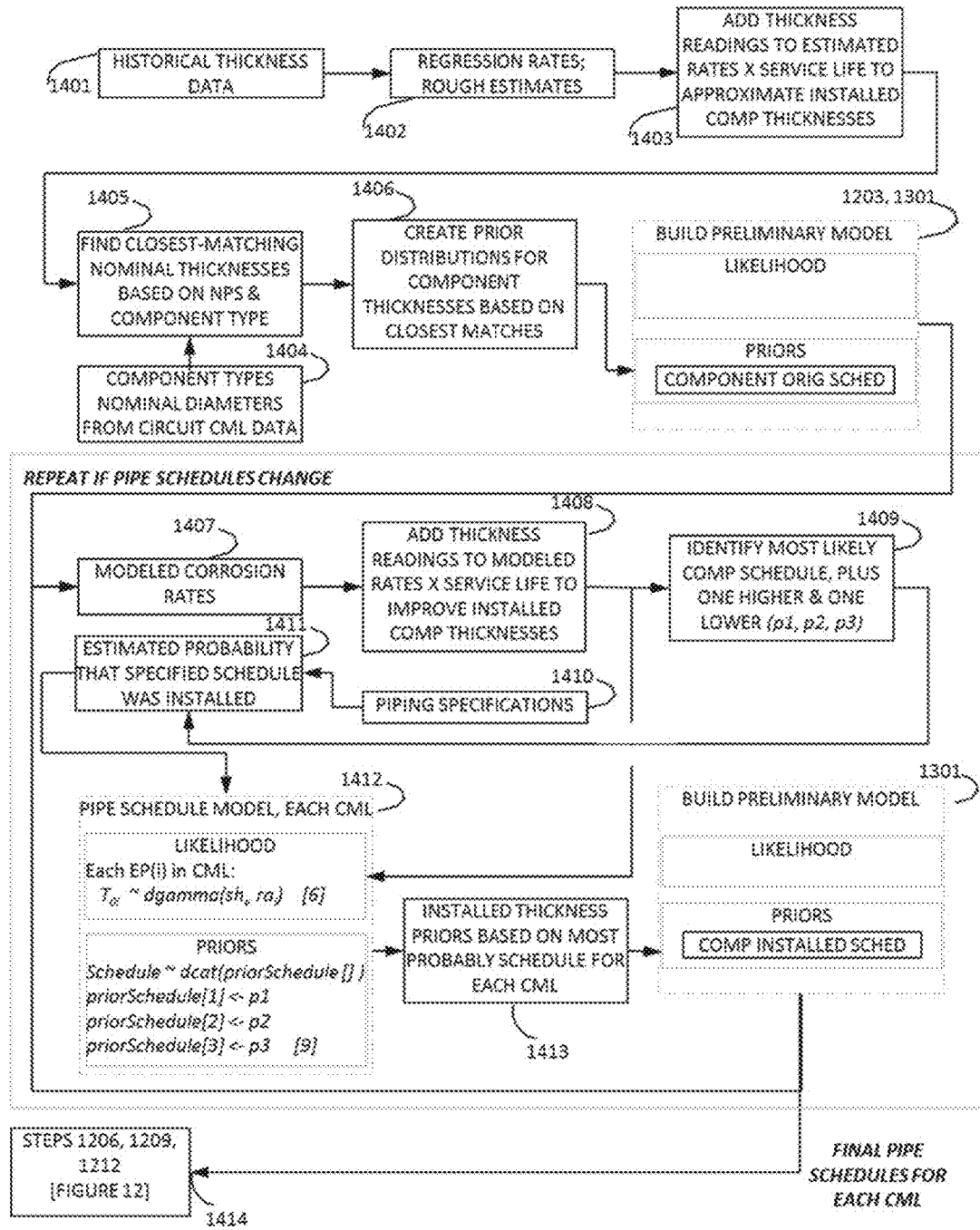
FIG. 14 is a flow chart illustrating a process for modeling a thickness data degradation analysis installed pipe schedule.

Referring to FIGS. 12 through 14, methods of thickness data modeling using degradation analysis is shown. A broad overview of an example method is shown in FIG. 12, with modeling specifics described in FIGS. 13 and 14. An extension of the degradation modeling process to perform CML optimization is outlined in FIG. 15.

The overview in FIG. 12 begins with translation of circuit inspection data from a facility's existing thickness monitoring database in step 1201. This translated data contains CML and historical thickness information for the circuit(s) of interest. Pertinent inspection program data is entered or imported to obtain estimates for the various model parameters, shown in step 1202 and detailed in FIG. 13. This additional information is based on inspector, facility and industry experience with a circuit's particular corrosion environment. Specifically, these inputs are related to the assignment of prior distributions for corrosion rates, component thicknesses and measurement error. For example, two methods for expressing the corrosion rate prior were discussed in the Summary section. The ability to transform inspection program information and related experience into prior distributions makes parameter estimates in the disclosed Bayesian model possible, while recent advances in computing power and simplified tools makes this approach practical for field use.

Steps 1203, 1206, 1209 and 1212 represent different versions of the circuit-specific Degradation Hierarchal Models, using translated input data and additional inspection information provided in steps 901 and 902. Specific details for the model-building processes are provided in FIG. 13. Parameter estimates and their uncertainties, for each of these models are obtained through multiple Markov Chain Monte Carlo (MCMC) runs throughout the modeling process, as shown in steps 1204, 1207, 1210 and 1213.

The "Preliminary" model prepared in step 1203, with the MCMC performed in step 1204 is a simplified version using a single, overall thickness measurement calibration error term for all surveys and rough estimates for component installed thicknesses. Both of these simplifications are made more rigorous in subsequent models. Output for this preliminary model (step 1205) includes MCMC diagnostics plus thickness degradation, corrosion rate and thickness residual plots, similar to FIGS. 1 through 10.

Results from this Preliminary model are refined in step 1206, referred to as the "Baseline" model. This version of the model employs separate calibration error terms for each survey, which more closely aligns with field practices. As discussed in the Summary section, the overall calibration term from the Preliminary model is used for small surveys, as there is insufficient thickness data to estimate an accurate error term in these cases. Improved estimates for component-installed schedules are also incorporated into in the Baseline model. The process for providing these improved estimates for installed schedules is detailed in FIG. 14. Both the per-survey calibration error terms and the improved installed schedule enhancements are used from this point forward in the disclosed process. The MCMC and output steps, 1207 and 1208 and the same as for the Preliminary case, but reflect updated information for the enhanced Baseline model.

Results from the Baseline model are used to identify if potential corrosion rate clusters exist in the circuit. If such clusters are found, as shown graphically in FIG. 11, this subsequent model utilizes an appropriate CML grouping, assigning separate corrosion rate distributions to each cluster, as shown in step 1209. The MCMC step 1210 utilizes this clustering model, but is otherwise similar to the Preliminary and Baseline cases. Reporting in step 1211 for this model is also similar to the earlier cases, but with the addition of a clustering plot shown in FIG. 11. These clustering model results are compared with grouping model results in the model evaluation step toward the end of the disclosed analysis process.

Following the cluster CML grouping model in steps 1209 through 1211, a series of additional models, with CML and/or EP groupings dependent on a particular circuit's DMs are constructed. Related experience with a circuit may also be used when considering appropriate CML groupings. Typical groupings include different components (e.g., elbows as a separate group), EP orientations (top or bottom EPs as group), nominal pipe sizes (pump suction vs. discharge piping) and flowing vs. stagnant or low-flow piping. These grouping models are shown in FIGS. 1212, 1213 and 1214. Similar to the clustering strategy indicated earlier, these DM-based groupings may yield improved model fit, indicating a better description of the corrosion environment. This grouping strategy is similar to the Corrosion engineering Model's grouping approach utilized by the Method of Selective Corrosion Rate Analysis: Sparago, (1997), Method of selective corrosion rate analysis for a fluid processing plant, U.S. Pat. No. 6,047,241A.

Upon the conclusion of all applicable model groupings, the results are available for model comparison, as shown in step 1215. A leave-out-out cross-validation is useful for such model comparisons. The best-fitting model revealed by this step is selected for further summary and plotting operations in steps 1216 through 1219.

ditions. Note that this scaling (step 1216) may address an increase in the mean rate by scaling $\mu_r$, an increase in the rate standard deviation by scaling $\sigma_r$, or increases in both parameters if future rates are expected to be both higher and more non-uniform.

Parameters from the disclosed model facilitate calculation of component thicknesses as a function of time. FIG. 8 shows typical component thickness distributions over time, and the relationship of these distributions to established t-Min and t-Crist values. Given these results, it is straightforward to estimate the proportion of the lower tail of the distribution that crosses the t-Min/t-Crit values at the next scheduled shutdown or RBI target date. Depending on the specific minimum thickness criteria used, the process in step 1217 provides either probability of retirement or probability of failure.

A series of plots are prepared in step 1218, including MCMC diagnostics, thickness degradation, corrosion rate, probability of failure and risk matrix plots. These plots are similar to those shown in FIGS. 1 through 10, and become the primary documentation for review of the model output, in order to gain insight into the corrosion environment, review any evidence of localized corrosion, recognize risk trends and identify any CMLs warranting follow-up examination. Table 4 provides a summary of the available plots, the inspection information available in each plot and potential follow-up work.

TABLE 4

Inspection Information Obtained From Model Output Plots

| Plot Type | Example FIG. | • Inspection Information<br>➤ Potential Follow-up |
|---|---|---|
| Thickness Degradation | 1A/1B | • View CML thickness trends vs. time<br>• Evaluate alignment between measured and modeled thicknesses<br>• Identify any measured thicknesses that are less than predicted<br>• Visualize uncertainty in projected thicknesses<br>• Assess thickness uncertainty related to the number of EPs per CML |
| Corrosion Rate | 3, 4, 5 | • Observe corrosion rate trends vs. time<br>• Assess individual CML rates and identify those exhibiting localized tendency<br>• Comparison of prior and posterior rates<br>➤ Consider follow-up examination for higher rate CMLs |
| Residuals | 6 | • Validate circuit design (qualitative)<br>• Identify outlier readings |
| Data Validation | 7 | • Validate circuit design (quantitative)<br>• Assess overall quality of historical thickness data<br>• Define percent of historical readings within HDI and ROPE<br>➤ Consider follow-up examination for EPs below HDI & ROPE<br>➤ Review circuit design if <90% of historical readings within HDI & ROPE |
| Thickness Projection | 8 | • Visualize CML thickness distributions vs. time and relationship to t-Min<br>➤ See Risk Matrix |
| Risk Matrix | 9 | • Assess Risk vs. time, including uncertainty<br>• Evaluate potential for CML optimization (increase or decrease number of CMLs) to achieve risk target<br>➤ Perform re-inspection at appropriate time on CMLs with unacceptable risk |
| MCMC Diagnostics | 10 | • Assess parameter convergence and autocorrelation<br>➤ Examine data for anomalies if diagnostics plot(s) appear unsatisfactory |
| Clustering | 11 | • Identify zones of potential localized corrosion<br>➤ Consider follow-up examination for any higher rate CML clusters |

In many cases, operating conditions and feedstocks for a circuit are assumed to be similar until the next scheduled shutdown or RBI target date. Sometimes, more severe conditions are anticipated, prompting adjustments to the remaining life or probability of failure (POF) estimates. After the best model is selected in step 1215, the corrosion rate posterior parameters $\mu_r$ and $\sigma_r$ from Equation [11] are scaled in accordance with published data, related data from a similar process or expert opinion estimates, to predict corrosion rates under the future, anticipated operating con- This concludes the overview of the disclosed Degradation modeling process. FIGS. 13 & 14 describe the model building, installed pipe schedule and grouping processes in more detail.

FIG. 13 outlines specific steps in the automated construction of the disclosed, circuit-specific, hierarchal Bayesian model. This model describes thickness loss over time, with model nodes incorporating the most significant sources of variability in the measurement, corrosion rate and component thickness processes. The overall model is depicted in step 1301, shown with selected likelihood equations presented in the Summary, and the prior distributions derived from inspection program data and other information that is readily available to a facility's inspectors and engineers.

This model is combined with historical thickness data, with model parameter estimates and their uncertainties ultimately obtained using standard Gibbs or Hamiltonian Monte Carlo methods. The resulting parameter estimates and uncertainties are summarized and displayed graphically to identify circuit corrosion rates and component thicknesses (i.e., degradation plots) as a function of time. MCMC diagnostics are made available to assess parameter convergence, consistent with best practices for Bayesian models. Further processing yields EP thickness residuals, circuit design validation and identification of data anomalies. Finally, CML-level probabilities of failure and risk plots with credible interval uncertainties are prepared.

The model in step 1301 is divided into likelihood (step 1302) and prior distribution (step 1303) sections. Step 1301 includes equation [5], showing the stochastic relationship between measured thicknesses as a function of time, $(T_{e_r})$, original thicknesses $(T_{O_i})$ and corrosion rates $(r_{e_i})$. This thickness relationship also includes a variance term dependent on both instrument calibration $(\sigma_{c_s}^2)$ and thickness location repeatability $(\sigma_{l_e}^2)$. Original thicknesses are dependent on NPS and component types present at each CML, as shown in [6], which is also shown in step 1001. Finally, corrosion rates are shown with a suitable transformation related to a mean, standard deviation and time-dependent rate adjustment, per Equations [11] and [12].

There is no closed solution to obtain estimates for the model parameters in step 1302 and other, related equations discussed in the Summary. For this reason, a Monte Carlo approach is utilized, after assignment of appropriate prior distributions in step 1303. An important feature of the disclosed model is the assignment of such priors and their relationship with information readily available in a typical facility's thickness monitoring database and unit inspection programs, which may include RBI program data. Prior distributions may also incorporate any combination of inspector, facility, company and/or industry experience, facilitating the ability of the disclosed method to more closely mirror actual field conditions. A discussion on each of these important prior distributions follows.

The corrosion rate prior distribution in step 1304 is one of the most important user inputs in the analysis process. This prior also represents the portion of the analysis when the inspector or engineer can impart their experience on the modeled corrosion environment. One of the advantages of the Bayesian model is that the prior will tend to dominate the results for sparse data sets, which is sometimes the case for historical thickness data. In contrast, the prior has little influence when there is sufficient and convincing data.

As mentioned in the Summary, corrosion rate priors can be effectively assigned by either specifying estimates for the mean and maximum rates, along with a confidence in the maximum rate or by selecting the limiting internal corrosion DM and a corrosion environment severity. These corrosion rate selections are shown in step 1305. Both of these techniques are straightforward, allowing inspectors and engineers to make prior distribution decisions without in-depth statistical training. This does not preclude individuals with additional training from creating their own corrosion rate prior distributions without the use of simplifying tools.

In addition to obtaining posterior estimates, a comparison of the prior and posterior often proves useful in validating the CML placement and quantity. For example, when there is substantial agreement between the prior and posterior corrosion rates, there is often no reason to suspect CML quantity and placement, and the inspection plan may remain undisturbed. When the prior and posterior corrosion rates are substantially different, it is useful to understand why this difference exists. It may be that the DMs were incorrect/outdated or that the CML data did not capture the true damage state. This can be an important finding because internal corrosion failures have occurred when CMLs and/or EP quantities were either insufficient or improperly placed. Such a comparison, followed by appropriate corrective action can avert an in-service failure.

Step 1306 shows the prior distribution for $T_{O_i}$, the component original wall thickness or pipe schedule for each particular CML. The distribution of component original thicknesses is defined at each CML to insure accurate modeling of degradation paths. Although component thicknesses are reasonably predictable for specific size-component combinations and given pipe schedule, manufacturing tolerances, although within American Society for Testing Materials (ASTM) specifications vary enough to cause performance issues in a Degradation model if typical thickness distributions were assumed. For this reason, model nodes for component thicknesses at each CML are utilized to reflect their stochastic nature. Fortunately, typical component distributions have sufficient accuracy to serve as meaningful priors once the installed schedules are known, and provided appropriate distributions (e.g. gamma) are used to model the likelihood.

As shown in step 1307, historical thickness data is used to both identify the installed pipe schedule and also estimate $T_{O_i}$ posterior distributions. A multi-step process is employed to increase the accuracy of these pipe schedule and posterior thickness distribution estimates. This installed pipe schedule process is shown in step 1308 and detailed in FIG. 14.

The calibration error variance prior distribution $(\sigma_{c_s}^2)$ is shown in step 1309. This parameter, which is assigned on a per survey basis, comprises instrument calibration, inspection technique and surface preparation type errors, per step 1310. As mentioned in the Summary, a baseline for $\sigma_{c_s}^2$ ranges 0.0017"-0.0025", for typical inspection programs with sound calibration practices and rigorous surface preparation practices. Step 1311 shows adjustments for inspection techniques as shown in Table 3.

The prior distribution for thickness location repeatability variance $(\sigma_{l_e}^2)$ is shown in step 1312. This parameter accounts for differences in EP reading locations during repeated inspections. Parameter $\sigma_{l_e}^2$, is based on NPS and component type for each EP. In general, this parameter increases with greater NPS and has higher values for tee and reducer components than straight pipe. Tabulated values for location repeatability for different NPS, component and orientations are used to select appropriate $\sigma_{l_e}^2$ values for each EP in steps 1313 and 1314. This tabulation was prepared based on thickness readings taken on a large number of components. For insulated CMLs with access holes drilled for inspection purposes, the inspection port diameter is also considered when selecting $\sigma_{l_e}^2$.

Corrosion rates frequently change over the life of a process unit, yet these rate changes are not modeled using current analysis techniques. If thickness data is available during periods of different corrosion environments, the rates as a function of time can be estimated with the appropriate model nodes. These prior distributions are referenced in step 1015. Equation [12] shows a simple and useful relationship allowing rate mean and variance estimates to be provided as prior distributions using relative rate estimates since unit startup. Operating and inspection personnel usually have intuition and experience related to trends in historical feedstocks and operating conditions, which facilitated the assignment of priors $RateAdj_{O_u}$, $RateAdj_{O_o}$ and $RateAdj_1$ in Equation [12], as shown in step 1316.

Equation [5] and FIG. 1A/1B show the installation date node, per step 1317. Unit startup dates are generally known with great certainty. Piping system replacements, including partial replacements are known with less accuracy. The disclosed model includes node(s) for installation (in-service) dates, with priors assigned as a best estimate for installation date and a confidence in the estimate, often reflected as a standard deviation in years. A single installation date can be assigned for the entire circuit, or individual dates can be installed per CML, as shown in step 1318.

With the likelihood equations prepared and prior distributions assigned, historical thickness data is loaded in step 1319 and the Markov Chain Monte Carlo (MCMC) settings are input in step 1020. Model parameters are estimated using standard MCMC methods. Multiple chains are utilized to aid in verifying parameter convergence and a large number of MCMC samples are taken, as shown in step 1321.

At the conclusion of the MCMC routine, a series of plots describing the model parameters are prepared in step 1322. These plots are similar to those shown FIGS. 1 through 10, as described in the Summary section.

Returning to step 1308, the pipe schedule model is a separate Bayesian modeling process used to provide the best estimate of the installed schedule at each CML, as was previously discussed. The details for this separate process are provided in FIG. 14. The originally installed, nominal thickness can be inferred through a review of historical thickness data (step 1401). However, many thickness surveys indicate some detectable wall loss from the installed value at one or more CMLs.

Improved installed thickness estimates can be obtained by adding an estimated total wall loss between installation and the inspection date, to thickness measurements at the particular inspection. In order to produce rough corrosion rate estimates, an initial linear regression analysis of thickness vs. time is performed in step 1402. These initial corrosion rates are multiplied by the applicable service life to produce estimated wall losses, which are added to measured thicknesses from step 1401. The resulting installed thickness estimates in step 1403 are combined with NPS and component type information from related CML data in step 1404 and a closest-matching pipe schedule is selected from a lookup table, for each CML in step 1405. These estimated pipe schedules serve as original component prior distributions using Equations [7] and [8] using hyperparameters $\mu_{bi}$ and $\sigma_{bi}$ as discussed in the Summary, for a preliminary analysis run in step 1106. Prior hyperparameters $\mu_{\beta_i}$ and $\mu_{\sigma_i}$ in Equations [7] and [8] are selected via a lookup table based on NPS, component type and installed schedule.

With the installed pipe schedule estimated for each CML and the related prior distributions established, the Preliminary model from FIG. 12, step 1203 is assembled using the techniques shown in FIG. 13, step 1301. The resulting model output provides corrosion rates in step 1407 that are more representative for the circuit, which are multiplied by the applicable service life to produce updated wall losses, then added to measured thicknesses in step 1408. The most likely pipe schedule, plus one schedule higher and one lower are identified by finding the closest matches based on the specific CML NPS and component types in step 1409. These three selected schedules are all considered possible candidates for installed components, as there can be overlap in neighboring pipe schedules and given the uncertainties when making estimates based on EP thicknesses, particularly for fittings. The three potential pipe schedules for each particular CML are designated p1, p2 and p3 in step 1409.

As discussed in the Summary, the piping specifications for a facility, or sometimes specifically for a unit or project within a unit, are strong indicators for installed component schedules. Accordingly, the applicable pipe specification in step 1410 provides the actual, installed schedule most of the time; exceptions may occur where post-construction replacements have been made or when dictated by component availability. Inspectors generally have experience relating to how likely the originally specified schedule was installed, which is quantified in step 1411 as a prior distribution in a separate pipe schedule model. This prior distribution takes the form of a categorical variable, whereby the installed schedule is one of the three categories p1, p2 or p3, as depicted in Equation [9], shown in the priors for step 1412. As discussed in the Summary, the specified pipe schedule (p1) generally has a prior probability in the 0.6 to 0.7 range; this is a site-specific decision based on historical experience. The remaining prior probabilities, p2 and p3 are usually split evenly, making p2 and p3=(1−p1)/2. Historical thicknesses for each CML become the data in likelihood Equation [6] and the model output in step 1413 yields the most likely installed pipe schedule for each CML, based on historical thickness data, modeled corrosion rates, piping specifications and adherence to those specifications.

The pipe schedule outputs from step 1413 become the basis for $T_{O_i}$ priors in the thickness Degradation model shown in FIG. 13 and particularly in step 1303. Steps 1407 through 1413 may be repeated in an iterative fashion until the installed schedules no longer change between subsequent iterations. After convergence of the final installed pipe schedules, these values are used in the Baseline and Grouping Models in FIG. 12, steps 1206, 1209 and 1212, as depicted by step 1414.

Figure 15:
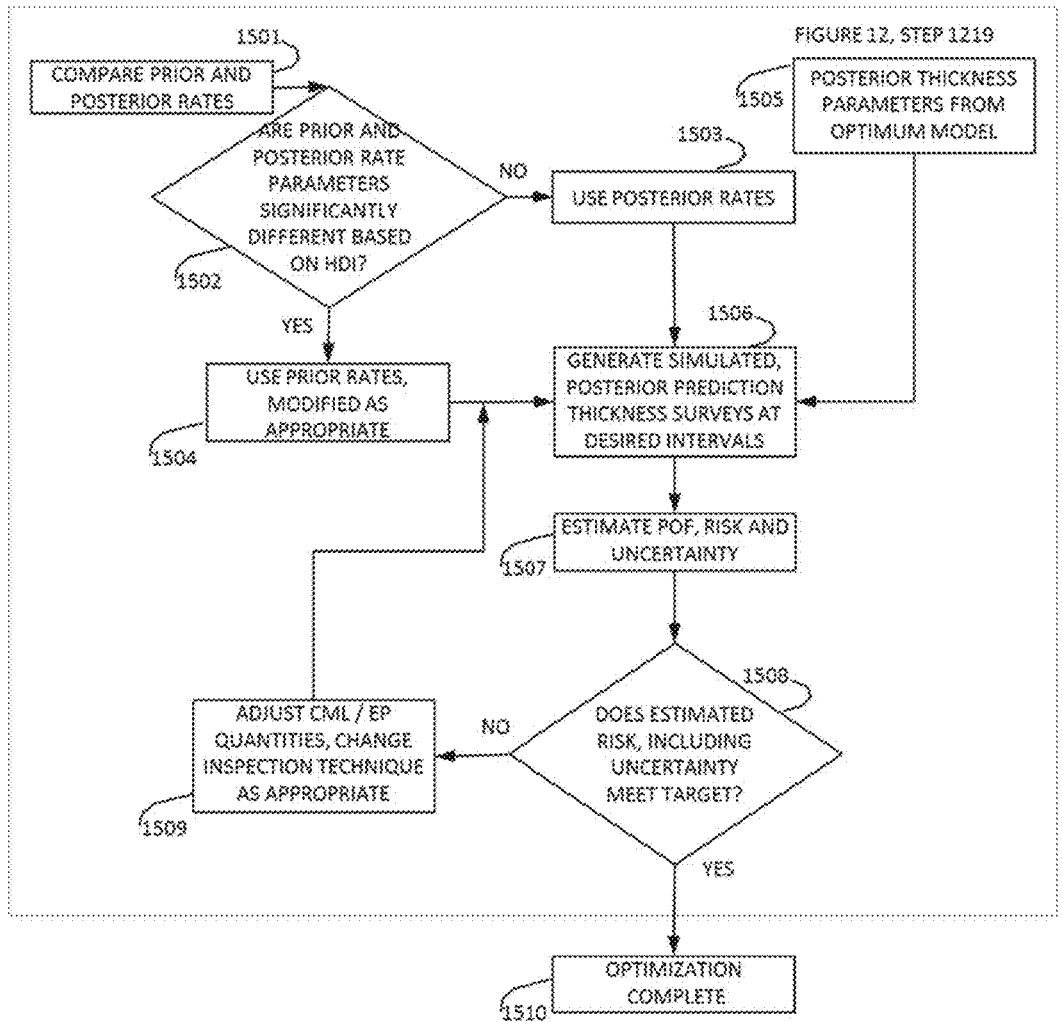
FIG. 15 is a flow chart illustrating an example CML optimization modeling process

Once corrosion rate and component thickness parameters have been estimated through the disclosed analysis process, this modeling may be extended to perform a quantitative, risk-based CML optimization. This optimization process may be employed when higher risks can be mitigated utilizing additional CMLs, EPs or the through the use of an inspection technique with greater inspection effectiveness. Optimization may also be used to identify opportunities to reduce CMLs or EPs during subsequent inspections for where the current quantities have demonstrated low risk. FIG. 15 outlines such a CML optimization process, The importance of comparing the prior and posterior corrosion rate distributions was discussed earlier and is shown in step 1501. When there is substantial agreement between the prior and posterior corrosion rate distributions, then the rates estimated from historical thickness measurements serve to validate the inspector or engineer's experience with a circuit's corrosion environment. In particular, it is of interest to know the relationships between the prior and posterior parameters for the corrosion rate means and variances. This comparison is shown in step 1502. If the posterior parameters indicate higher or more non-uniform behavior than expected, based on the priors using 95% HDI criteria, then there is convincing evidence that historical thickness data was taken at CMLs and EPs that met or exceeded the expected rates. In this case, the posterior rates should be used for CML optimization, per step 1503.

If the posterior parameters indicate lower or more uniform corrosion than anticipated based on the assigned corrosion rate priors however, then either the prior corrosion rate distribution was pessimistic (i.e., anticipated environment too severe) or the existing CMLs and EPs were not properly located to facilitate identification of the corrosion environment. In this case, per step 1504, the prior distribution should be reviewed and adjusted, consistent with expert opinion and the revised prior should be used for CML optimization, unless there is substantial evidence to the contrary.

Utilizing component thickness posterior parameters from the disclosed thickness degradation model (step 1505) and the selected corrosion rate distribution parameters above, simulated thickness inspection data is generated at desired intervals in step 1506. This is followed by the probability of failure and risk, including uncertainty estimates in step 1507. As discussed previously, additional CMLs and EPs reduce uncertainty; fewer CMLs and EPs generate increased uncertainty. A comparison of the estimated risk (including uncertainty) to the target risk is made in step 1508.

The process of adding or deleting CMLs and EPs continues until the risk target at the specified date is satisfied, per step 1509. If the estimated risk exceeds the target value, CMLs and EPs are added and the simulation process is repeated. When adding CMLs and EPs, if the risk estimate is significantly below the target, CMLs and EPs are removed. For significantly non-uniform environments, the amount of monitoring may become impractical with spot UT readings. In these cases, the increased inspection effectiveness of UT scanning, automated UT or RT would be considered. At the conclusion of the simulation process in step 1509, the risk target has been satisfied and CML Optimization is complete.

Note that this modeling process may reveal that additional inspection is not an effective mitigation in meeting the risk target. When this result occurs, replacement of the affected component(s) is called for.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known processes, structures, and techniques have been shown without unnecessary detail to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional stages or functions not included in the figure.

Having described several example configurations, various modifications, alternative constructions, and equivalents may be used without departing from the spirit of the disclosure. For example, the above elements may be components of a larger system, wherein other structures or processes may take precedence over or otherwise modify the application of the invention. Also, a number of operations may be undertaken before, during, or after the above elements are considered. Accordingly, the above description does not bound the scope of the claims.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

What is claimed is:

1. A method for implementing a hierarchical Bayesian model for pipe wall thickness monitoring, comprising automating construction of the model nodes for a particular equipment, utilizing component data, historical thickness measurements and related inspection information and;
where the hierarchical Bayesian model utilizes an overarching corrosion rate distribution and hierarchal shrinkage to account for the potential for differences in condition monitoring location (CML) rates.

2. The method of claim 1, with nodes including component original thicknesses, wall thickness loss over time, calibration error and measurement location repeatability error.

3. The method of claim 1, with a hierarchical Bayesian model prior corrosion rate distribution obtained by transforming the expected mean and maximum rates plus the confidence in this maximum rate for the particular equipment, into a continuous distribution.

4. The method of claim 1, with a hierarchical Bayesian model prior corrosion rate distribution obtained by transforming the limiting internal thinning damage mechanisms and a measure of corrosion environment severity for the particular equipment, into a continuous distribution.

5. The method of claim 1, further comprising utilizing a hierarchical Bayesian model prior distributions for calibration error obtained by assessing facility-specific thickness monitoring practices, including surface preparation and instrument calibration.

6. The method of claim 1, further comprising producing quantitative probability of failure information through estimation of the intersection of a future, projected thickness distribution lower tail with the established minimum thickness value.

7. The method of claim 1, with time-dependent corrosion rates, utilizing prior distributions that reflect estimates of relative corrosion rate mean and variance since unit startup.

8. The method of claim 1, further comprising utilizing an overarching corrosion rate distribution and hierarchal shrinkage to account for the potential for differences in condition monitoring location (CML) rates.

9. The method of claim 1, with grouping by CML corrosion rate clusters, to identify zones of potential localized corrosion.

10. The method of claim 1, with CML or examination points (EP) grouping consistent with localized corrosion trends frequently experienced, based on a circuit's assigned internal thinning damage mechanisms (DMs), to identify areas of potential localized corrosion.

11. A series of models of the type in claim 1, which are evaluated to identify the best-fitting model using a leave-one-out cross validation or similar technique, in order to determine the nature of localized corrosion in the specific equipment.

12. The method of claim 1, further comprising utilizing credible or highest density intervals for historical thicknesses to validate the design of the specific equipment.

13. The method of claim 1, further comprising employing credible or highest density intervals for historical thicknesses to identify data anomalies or locations warranting follow-up evaluation.

14. The method of claim 1, further comprising employing credible or highest density intervals for historical thicknesses to identify locations with potential for localized corrosion thereby identifying follow-up evaluation.

15. The method of claim 1, where posterior corrosion rate distribution mean and/or variance parameters are scaled to account for anticipated, future operating conditions.

16. The method of claim 1, further comprising utilizing hierarchical Bayesian model credible intervals for probability of failure used to optimize the number of CMLs or EPs.

17. The method of claim 1, with thickness measurements treated as right-censored data, to accommodate inspection programs where multiple EP thicknesses are taken per CML, yet only the minimum thickness for the CML is recorded.

18. A simulation process utilizing parameter values from the method in claim 1 to quantitatively perform CML optimization, by controlling risk uncertainty as a function of CML and EP quantities.

19. A risk matrix employing risk uncertainty for a specified point in time, based on credible or highest density intervals from the method in claim 1.

20. The method of claim 1, wherein the particular equipment includes one or more of a particular piping circuit or piece of major fixed equipment, including towers, drums, storage tanks, heat exchangers, pressure vessels, and fired heaters.

* * * * *